United States Patent
Choi et al.

(10) Patent No.: US 12,349,127 B2
(45) Date of Patent: Jul. 1, 2025

(54) METHOD, DEVICE, AND SYSTEM FOR TRANSMITTING OR RECEIVING PHYSICAL UPLINK SHARED CHANNEL (PUSCH) IN WIRELESS COMMUNICATION SYSTEM

(71) Applicant: WILUS INSTITUTE OF STANDARDS AND TECHNOLOGY INC., Gyeonggi-do (KR)

(72) Inventors: Kyungjun Choi, Gyeonggi-do (KR); Minseok Noh, Seoul (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 277 days.

(21) Appl. No.: 17/636,350

(22) PCT Filed: Aug. 17, 2020

(86) PCT No.: PCT/KR2020/010931
§ 371 (c)(1),
(2) Date: Feb. 17, 2022

(87) PCT Pub. No.: WO2021/034063
PCT Pub. Date: Feb. 25, 2021

(65) Prior Publication Data
US 2022/0312446 A1    Sep. 29, 2022

(30) Foreign Application Priority Data

Aug. 17, 2019  (KR) .................. 10-2019-0100667
Sep. 5, 2019   (KR) .................. 10-2019-0110265
(Continued)

(51) Int. Cl.
*H04W 72/12*   (2023.01)
*H04L 1/00*    (2006.01)
(Continued)

(52) U.S. Cl.
CPC ....... *H04W 72/1268* (2013.01); *H04L 1/0004* (2013.01); *H04W 72/0453* (2013.01); *H04W 72/23* (2023.01)

(58) Field of Classification Search
CPC .................. H04W 72/23; H04W 72/0446
(Continued)

(56) References Cited

U.S. PATENT DOCUMENTS 10,314,037 B2   6/2019   Chen et al.
10,980,049 B2   4/2021   Yang et al.
(Continued)

FOREIGN PATENT DOCUMENTS

CN   106063177   10/2016
CN   203069028   7/2023
(Continued)

OTHER PUBLICATIONS

Office Action dated Jul. 8, 2022 for Korean Patent Application No. 10-2021-7038863 and its English translation provided by Applicant's foreign counsel.
(Continued)

*Primary Examiner* — Kiet M Doan
(74) *Attorney, Agent, or Firm* — WOMBLE BOND DICKINSON (US) LLP

(57) ABSTRACT

There is disclosed a method for transmitting a physical uplink shared channel (PUSCH) to a base station by a user equipment in a wireless communication system. The user equipment may receive a first physical downlink control channel (PDCCH) including first downlink control information (DCI) from the base station, and release the activated
(Continued)

configuration for repetitive transmission of the PUSCH based on the received DCI.

14 Claims, 21 Drawing Sheets

(30) Foreign Application Priority Data

Feb. 10, 2020 (KR) ........................ 10-2020-0015919
Feb. 11, 2020 (KR) ........................ 10-2020-0016625

(51) Int. Cl.
  *H04W 72/0453* (2023.01)
  *H04W 72/1268* (2023.01)
  *H04W 72/23* (2023.01)

(58) Field of Classification Search
  USPC ........................................ 370/329, 311, 335
  See application file for complete search history.

(56) References Cited

U.S. PATENT DOCUMENTS

| | | | |
|---|---|---|---|
| 11,018,946 | B1 | 5/2021 | Babaei |
| 11,490,406 | B2 | 11/2022 | Choi et al. |
| 11,653,353 | B2 | 5/2023 | Choi et al. |
| 2010/0165939 | A1 | 7/2010 | Lin |
| 2013/0343313 | A1 | 12/2013 | Takeda et al. |
| 2016/0241363 | A1 | 8/2016 | Noh et al. |
| 2016/0295561 | A1 | 10/2016 | Papasakellariou |
| 2016/0338029 | A1 | 11/2016 | Fan et al. |
| 2017/0134140 | A1 | 5/2017 | Park |
| 2018/0014284 | A1 | 1/2018 | Yi et al. |
| 2018/0019842 | A1 | 1/2018 | Fu et al. |
| 2018/0310257 | A1 | 10/2018 | Papasakellariou |
| 2019/0207667 | A1 | 7/2019 | Zhou et al. |
| 2020/0245335 | A1 | 7/2020 | Joseph et al. |
| 2020/0336239 | A1 | 10/2020 | Khoshnevisan et al. |
| 2020/0413424 | A1 | 12/2020 | Fakoorian et al. |
| 2021/0014881 | A1* | 1/2021 | Aiba .................. H04B 7/0626 |
| 2021/0051634 | A1 | 2/2021 | Fakoorian et al. |
| 2021/0068115 | A1* | 3/2021 | Gotoh ............... H04W 72/0453 |
| 2021/0112578 | A1 | 4/2021 | Yang et al. |
| 2021/0144686 | A1 | 5/2021 | Fakoorian et al. |
| 2021/0144688 | A1 | 5/2021 | Lin et al. |
| 2022/0086882 | A1* | 3/2022 | Takeda .................. H04L 5/0096 |
| 2022/0191900 | A1* | 6/2022 | Takeda ............... H04W 72/1268 |

FOREIGN PATENT DOCUMENTS

| | | |
|---|---|---|
| EP | 3 364 582 | 8/2018 |
| TW | 201904338 | 1/2019 |
| WO | 2015/062078 | 5/2015 |
| WO | 2017/043916 | 3/2017 |
| WO | 2017/192793 | 11/2017 |
| WO | 2018/128474 | 7/2018 |
| WO | 2019/003635 | 1/2019 |
| WO | 2020/214376 | 10/2020 |
| WO | 2020/214950 | 10/2020 |
| WO | 2020/222624 | 11/2020 |
| WO | 2021/040681 | 3/2021 |
| WO | 2021/065864 | 4/2021 |
| WO | 2021/066013 | 4/2021 |
| WO | 2021/066117 | 4/2021 |
| WO | 2021/072610 | 4/2021 |
| WO | 2021/090734 | 5/2021 |

OTHER PUBLICATIONS

Extended European Search Report dated Jul. 22, 2022 for European Patent Application No. 20798932.8.
WILUS Inc.: "Remaining Issues on UCI enhancement for NR URLLC", 3GPP TSG RAN WG1 #99, R1-1913068, Reno, USA, Nov. 18-22, 2019, pp. 1-8.
Office Action dated Jul. 27, 2022 for Indian Patent Application No. 202227012623.
Notice of Allowance dated May 16, 2022 for U.S. Appl. No. 17/516,700.
International Preliminary Report on Patentability (Chapter I) for PCT/KR2020/005923 issued on Nov. 2, 2021 and its English translation from WIPO.
International Preliminary Report on Patentability (Chapter I) for PCT/KR2020/010931 issued on Feb. 17, 2022 and its English translation from WIPO.
Notice of Allowance dated Mar. 20, 2023 for Japanese Patent Application No. 2021-565145 and its English translation provided by Applicant's foreign counsel.
Nokia, Nokia Shanghai Bell: "On UCI multiplexing", 3GPP TSG RAN WG1 Meeting #93, R1-1806927, Busan, Korea, May 21-25, 2018, pp. 1-7.
Notice of Allowance dated Mar. 30, 2023 for U.S. Appl. No. 17/871,886.
Notice of Allowance dated Apr. 26, 2023 for Chinese Patent Application No. 202080042075.X and its English translation provided by Applicant's foreign counsel.
Office Action dated Sep. 20, 2022 for Japanese Patent Application No. 2021-565145 and its English translation provided by Applicant's foreign counsel.
Notice of Allowance dated Nov. 21, 2022 for Korean Patent Application No. 10-2021-7038863 and its English translation provided by Applicant's foreign counsel.
Office Action dated Dec. 5, 2022 for U.S. Appl. No. 17/871,881.
International Search Report for PCT/KR2020/010931 mailed on Dec. 3, 2020 and its English translation from WIPO.
Written Opinion of the International Searching Authority for PCT/KR2020/010931 mailed on Dec. 3, 2020 and its English translation from WIPO.
Nokia et al.: "On Enhanced UL Configured Grant Transmission for NR URLLC and activation/release of multiple SPS configurations" 3GPP TSG RAN WG1 Meeting #98, R1-1908971, Prague, CZ, Aug. 16, 2019.
Nokia et al.: "On Configured Grant enhancements for NR URLLC", 3GPP TSG RAN WG1 ad-Hoc Meeting 1901, R1-1900932, Taipei, Taiwan, Jan. 12, 2019.
3GPP TS 38.213 V15.6.0: 3$^{rd}$ Generation Partnership Project; Technical Specification Group Radio Access Network; NR; Physical layer procedures for control (Release 15), Jun. 24, 2019.
Nokia et al.: "On resource conflicts between UL grants and HARQ-ACK Enhancements for SPS", 3GPP TSG RAN WG1 Meeting #98, R1-1908439, Prague, CA, Aug. 16, 2019.
International Search Report for PCT/KR2020/005923 mailed on Aug. 27, 2020 and its English translation from WIPO (now published as WO 2020/222624).
Written Opinion of the International Searching Authority for PCT/KR2020/005923 mailed on Aug. 27, 2020 and its English translation from WIPO (now published as WO 2020/222624).
Samsung: "Specification update on HARQ-ACK Codebooks Incorporating Proposals in RAN1#94", 3GPP TSG RAN WG1 #94, R1-1809706, Gothenburg, Sweden. Aug. 21, 2018.
Nokia et al.: "On remaining details of HARQ procedure", 3GPP TSG RAN WG1 Meeting #91, R1-1720480, Reno, USA, Nov. 17, 2017.
Nokia et al.: "Remaining aspects of NR CA", 3GPP TSG RAN WG1 Meeting #92, R1-1802540, Athens, Greece, Feb. 16, 2018.
Nokia et al.: "On remaining aspects of NR CA/DC", 3GPP TSG-RAN WG1 Meeting NR#91, R1-1720512, Reno, USA, Nov. 17 2017.
Office Action dated Feb. 3, 2022 for U.S. Appl. No. 17/516,700.
Office Action dated Dec. 19, 2022 for U.S. Appl. No. 17/871,886.
Office Action dated Nov. 23, 2022 for Chinese Patent Application No. 202080042075.X and its English translation provided by Applicant's foreign counsel.
Notice of Allowance dated Jan. 12, 2023 for Korean Patent Application No. 10-2021-7038863 and its English translation provided by Applicant's foreign counsel.

(56) References Cited

OTHER PUBLICATIONS

Office Action dated Dec. 20, 2023 for Taiwanese Patent Application No. 109127972 and its English translation provided by Applicant's foreign counsel.
Office Action dated Jan. 18, 2024 for Korean Patent Application No. 10-2022-7005656 and its English translation provided by Applicant's foreign counsel.
NTT DOCOMO, Inc.: "Enhanced UL transmission with configured grant for URLLC", 3GPP TSG RAN WG1 #96bis, R1-1904962, Xi'an, China, Apr. 3, 2019, pp. 1-5.
Samsung: "UL configured grants for eURLLC", 3GPP TSG RAN WG1 #98, R1-1908495, Prague, CZ, Aug. 16, 2019, pp. 1-5.
Office Action dated Mar. 12, 2024 for U.S. Appl. No. 18/222,685.
Notice of Allowance dated Jun. 3, 2024 for Japanese Patent Application No. 2023-067937 and its English translation provided by Applicant's foreign counsel.
NEC: "UCI enhancements for NR URLLC", 3GPP TSG RAN WG1 #96bis, R1-1904223, Xi'an, China, Apr. 2, 2019, pp. 1-7.
Notice of Allowance dated Jun. 3, 2024 for Japanese Patent Application No. 2023-067938 and its English translation provided by Applicant's foreign counsel.
Notice of Allowance dated May 30, 2024 for Taiwanese Patent Application No. 109127972 and its English translation provided by Applicant's foreign counsel.
Notice of Hearing dated Jun. 24, 2024 for Indian Patent Application No. 202227012623.
Notice of Allowance dated Jul. 1, 2024 for U.S. Appl. No. 18/222,685.
Office Action dated Sep. 3, 2024 for Korean Patent Application No. 10-2022-7005656 and its English translation provided by Applicant's foreign counsel.
LG Electronics: "Summary#2 of 7.2.6.7 Others", 3GPP TSG RAN WG1 #98bis, R1-1911554, Chongqing, China, Oct. 22, 2019, pp. 1-14.
Qualcomm Incorporated: "Enhanced Grant-Free Transmissions for eURLLC", 3GPP TSG-RAN WG1 #99, R1-1912964, Reno, Nevada, Nov. 9, 2019, pp. 1-4.
NTT DOCOMO Inc.: "Summary#2 on remaining issues for Rel. 16 enhanced configured grant", 3GPP TSG RAN WG1 #100, R1-2001171, e-Meeting, Feb. 24, 2020, pp. 1-25.
Office Action dated Nov. 29, 2024 for Indian Patent Application No. 202127053143.
Office Action ($1^{st}$) dated Dec. 16, 2024 for Chinese Patent Application No. 202080066917.5 and its English translation provided by Applicant's foreign counsel.
Extended European Search Report dated Apr. 7, 2025 for European Patent Application No. 24223755.0.
Extended European Search Report dated Apr. 7, 2025 for European Patent Application No. 24223760.0.

\* cited by examiner (a)

(b)

METHOD, DEVICE, AND SYSTEM FOR TRANSMITTING OR RECEIVING PHYSICAL UPLINK SHARED CHANNEL (PUSCH) IN WIRELESS COMMUNICATION SYSTEM

CROSS-REFERENCE TO RELATED APPLICATIONS

This application is the U.S. National Stage of International Patent Application No. PCT/KR2020/010931 filed on Aug. 17, 2020, which claims the priority to Korean Patent Application No. 10-2019-0100667 filed in the Korean Intellectual Property Office on Aug. 17, 2019, Korean Patent Application No. 10-2019-0110265 filed in the Korean Intellectual Property Office on Sep. 5, 2019, Korean Patent Application No. 10-2020-0015919 filed in the Korean Intellectual Property Office on Feb. 10, 2020 and Korean Patent Application No. 10-2020-0016625 filed in the Korean Intellectual Property Office on Feb. 11, 2020, the entire contents of which are incorporated herein by reference.

TECHNICAL FIELD

The present invention relates to a wireless communication system, and more particularly, to a method for transmitting/receiving a physical uplink shared channel (PUSCH) in a wireless communication system.

BACKGROUND ART

3GPP LTE(-A) defines uplink/downlink physical channels to transmit physical layer signals. For example, a physical uplink shared channel (PUSCH) that is a physical channel for transmitting data through an uplink, a physical uplink control channel (PUCCH) for transmitting a control signal, a physical random access channel (PRACH), and the like are defined, and there are a physical downlink shared channel (PDSCH) for transmitting data to a downlink as well as a physical control format indicator channel (PCFICH) for transmitting L1/L2 control signals, a physical downlink control channel (PDCCH), a physical hybrid ARQ indicator channel (PHICH), and the like.

The downlink control channels (PDCCH/EPDCCH) among the above channels are channels for a base station to transmit uplink/downlink scheduling allocation control information, uplink transmit power control information, and other control information to one or more user equipments. Since resources available for PDCCH that can be transmitted by a base station at one time are limited, different resources cannot be allocated to each user equipment, and control information should be transmitted to an arbitrary user equipment by sharing resources. For example, in 3GPP LTE(-A), four resource elements (REs) may be grouped to form a resource element group (REG), nine control channel elements (CCEs) may be generated, resources capable of combining and sending one or more CCEs may be notified to a user equipment, and multiple user equipments may share and use CCEs. Here, the number of combined CCEs is referred to as a CCE combination level, and a resource to which CCE is allocated according to a possible CCE combination level is referred to as a search space. The search space may include a common search space defined for each base station and a terminal-specific or UE-specific search space defined for each user equipment. A user equipment performs decoding for the number of cases of all possible CCE combinations in the search space and may recognize whether the user equipment belongs to a PDCCH through a user equipment (UE) identifier included in the PDCCH. Therefore, such an operation of a user equipment requires a long time for decoding a PDCCH and unavoidably causes a large amount of energy consumption.

Efforts are being made to develop an improved 5G communication system or pre-5G communication system to satisfy wireless data traffic demand that is increasing after the commercialization of a 4G communication system. For this reason, a 5G communication system or pre-5G communication system is referred to as a beyond 4G network communication system or post-LTE system. It is considered to implement a 5G communication system in an ultrahigh frequency (mmWave) band (e.g., 60-GHz band) to achieve a high data transfer rate. To reduce a radio propagation path loss and increase a transfer distance of radio waves in an ultrahigh frequency band, beamforming, massive MIMO, full dimensional MIMO (FD-MIMO), array antenna, analog beamforming, and large scale antenna technologies are discussed in the field of a 5G communication system. Furthermore, to improve a network of a system, technologies such as advanced small cell, cloud radio access network (cloud RAN), ultra-dense network, device-to-device communication (D2D), wireless backhaul, moving network, cooperative communication, Coordinated Multi-Points (CoMP), interference cancellation, and the like are developed in the field of a 5G communication system. In addition, hybrid FSK and QAM modulation (FQAM) and sliding window superposition coding (SWSC), which are advanced coding modulation (ACM) schemes, and filter bank multi carrier (FBMC), nonorthogonal multiple access (NOMA), and sparse code multiple access (SCMA), which are advanced access technologies, are developed in the field of a 5G system.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Here, various attempts are made to apply a 5G communication system to an IoT network. For example, technologies such as sensor network, machine to machine (M2M), and machine type communication (MTC) are implemented with 5G communication technologies, i.e., beamforming, MIMO, array antenna, and the like. Applying a cloud radio access network (cloud RAN) as the above-described big data processing technology may be an example of convergence of 5G technology and IoT technology.

In general, a mobile communication system has been developed to provide a voice service while securing activity of a user. However, the area of a mobile communication system is expanding to not only a voice service but also a data service, and has been so developed as to provide a high-speed data service at the present time. However, in a mobile communication system which is currently being used to provide a service, a resource shortage phenomenon occurs, and users require higher-speed services. Thus, a more developed wireless communication system is required.

As described above, a future 5G technology requires lower latency of data transmission with the advent of new applications such as real-time control and tactile Internet, and a required latency of 5G data is expected to be decreased to 1 ms. 5G has an objective of providing a data latency that is reduced by about 10 times compared to the prior art. To resolve such problems, a 5G communication system is expected to be proposed, which uses a mini-slot having a shorter TTI interval (e.g., 0.2 ms) in addition to an existing slot (or subframe).

In the Rel-16 enhanced URLLC (eURLLC), various technologies for providing a lower latency time and higher reliability are discussed. To provide a lower latency time, transmission of an uplink control channel including two or more HARQ-ACKs in a single slot is supported. A user equipment is enabled to transmit HARQ-ACK as quickly as possible as a response for success of reception of a downlink shared channel, thereby securing a lower latency time.

Disclosure of the Invention

Technical Problem

An object of an embodiment of the present invention is to provide a method for transmitting a physical uplink shared channel (PUSCH) to a base station by a user equipment in a wireless communication system, and the user equipment for the same.

In addition, another object of the present invention is to provide a method for allocating resources for periodically transmitting a PUSCH to a base station based on a configured grant and a user equipment for the same.

In addition, yet another object of the present invention is to provide a method for activating/releasing a configuration for periodically transmitting a PUSCH to a base station based on a configured grant and a user equipment for the same.

Technical Solution

A method for transmitting a physical uplink shared channel (PUSCH) to a base station by a user equipment in a wireless communication system includes: receiving a first physical downlink control channel (PDCCH) including first downlink control information (DCI) from the base station, the first DCI including a first specific identifier (ID) for release of one or more configurations configured for transmission of the PUSCH based on a configured grant, the PUSCH representing a channel periodically transmitted through resources configured repeatedly according to the configured grant, the first specific identifier indicating one or more configurations configured for the transmission of the PUSCH; and releasing the one or more configurations indicated by the first specific identifier.

Furthermore, in the present invention, the first specific identifier is indicated by a Hybrid Automatic Repeat Request (HARQ) process number (HARQ process number) field of the first DCI when a plurality of configurations is configured for the transmission of the PUSCH, and the HARQ process number field is used to identify the one or more configurations among the plurality of configurations.

Furthermore, in the present invention, the method further includes receiving configuration information for identifying the one or more configurations, in which the configuration information includes a plurality of identifiers corresponding to a specific value of the HARQ process number field, each of the plurality of identifiers individually corresponds to the one or more configurations, and the one or more configurations corresponding to the plurality of identifiers are released when the HARQ process number field is indicated by a specific value.

Furthermore, in the present invention, the first DCI is scrambled with CS-RNTI and further includes a new data indicator (NDI) field that indicates new data transmission, a redundancy version (RV) field, a modulation and coding scheme (MCS) field, and a frequency domain resource assignment (FDRA) field for resource allocation in the frequency domain.

Furthermore, in the present invention, validation of the DCI is determined based on the NDI field, the RV field, the MCS field, the HARQ process number field, and the FDRA field, when one configuration is configured for the transmission of the PUSCH, and the validation of the DCI is determined based on the NDI field, the RV field, the MCS field, and the FDRA field excluding the HARQ process number field, when a plurality of configurations are configured for the transmission of the PUSCH.

Furthermore, in the present invention, whether the DCI indicates release of the one or more configurations is identified based on a value according to a type of the FDRA field.

Furthermore, in the present invention, the value of the FDRA field for identifying whether the DCI indicates release of the one or more configurations varies depending on a type of FDRA, when a dynamic switch by which the type of the FDRA is determined according to a value of a most significant bit (MSB) of the FDRA field is set.

Furthermore, in the present invention, the method further includes receiving configuration information for transmission of the PUSCH from the base station, in which the configuration information includes an offset, a period, and the number of HARQ processes for determining a HARQ process number for the transmission of the PUSCH.

Furthermore, in the present invention, the HARQ process number is determined by adding the offset to a value determined based on a slot number in a frame, the number of slots in each frame, a system frame number (SFN), the number and period of the HARQ processes.

Furthermore, in the present invention, the method further includes receiving configuration information for the transmission of the PUSCH; receiving a second PDCCH including a second DCI for scheduling a resource for transmission of the PUSCH based on the configuration information, the second DCI including a second specific identifier (ID) for activation of a configuration configured for the transmission of the PUSCH, the second specific identifier indicating one or more configurations configured for the transmission of the PUSCH; activating the one or more configurations indicated by the second specific identifier; and performing the transmission of the PUSCH through the allocated resources based on the activated one or more configurations.

Furthermore, in the present invention, the second DCI further includes start group indexes of a plurality of resource groups for the transmission of the PUSCH and lengths of the plurality of resource groups.

Furthermore, the present invention provides a user equipment including a communication module and a processor controlling the communication module, wherein the processor: receives a first physical downlink control channel (PDCCH) including first downlink control information (DCI) from the base station, the first DCI including a first specific identifier (ID) for release of one or more configurations configured for transmission of PUSCH based on a configured grant, the PUSCH representing a channel periodically transmitted through resources configured repeatedly according to the configured grant, the first specific identifier indicating one or more configurations configured for the transmission of the PUSCH; and releases the one or more configurations indicated by the first specific identifier.

Advantageous Effects

According to a method for a user equipment to repeatedly transmit PUSCH to a base station according to an embodiment of the present invention, the target performance of a 5G wireless communication system for providing a highly reliable service with low latency can be achieved by enabling a user equipment to repeatedly transmit PUSCH to a base station as quickly as possible.

In addition, the present invention has an effect of efficiently allocating a group of resource blocks for periodic transmission of a PUSCH based on a configured grant by allocating the group through a start group index and a length thereof.

In addition, the present invention has an effect of efficiently activating/releasing a plurality of configurations for periodic transmission of the PUSCH based on the configured grant by activating/releasing the configurations through one identifier.

The effects obtained by the present invention are not limited to the above effects, and other effects would be clearly understood by those of ordinary skill in the art from the following description.

MODE FOR CARRYING OUT THE INVENTION

Figure 1:
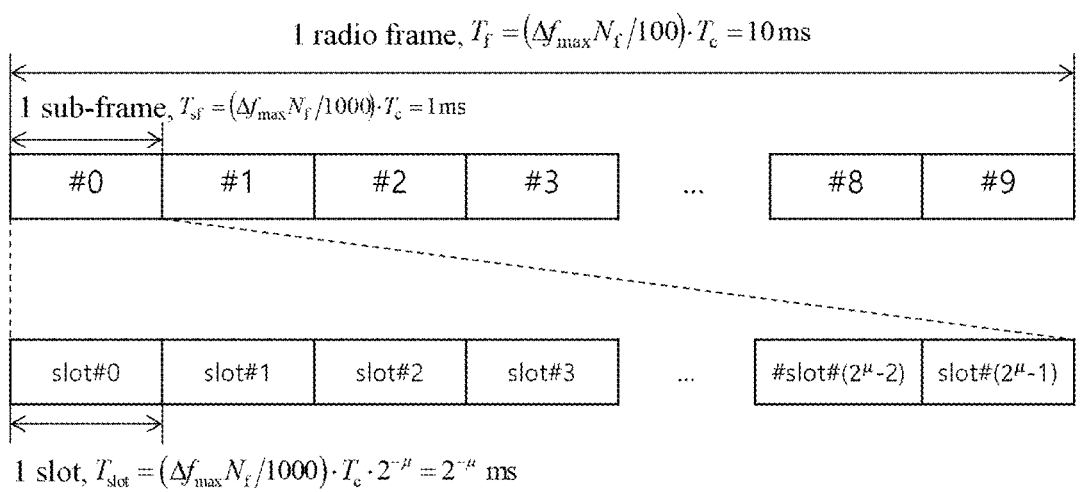
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified in this specification, a base station may refer to a next generation node B (gNB) as defined in 3GPP NR. Furthermore, unless otherwise specified, a terminal may refer to a user equipment (UE).

Although details of the description are separately categorized into embodiments below to assist with an understanding, the embodiments may be used in combination. In the present disclosure, a configuration of a user equipment may represent a configuration by a base station. In detail, a base station may transmit a signal to a user equipment to set a parameter value used in operation of the user equipment or a wireless communication system.

FIG. 1 illustrates an example of a wireless frame structure used in a wireless communication system. Referring to FIG. 1, the wireless frame (or radio frame) used in the 3GPP NR system may have a length of 10 ms ($\Delta f_{max} N_f / 100)^* T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and μ can have a value of μ=0, 1, 2, 3, 4 as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^\mu$ ms. Numbers from 0 to $2^\mu-1$ may be respectively allocated to $2^\mu$ slots within one subframe. In addition, numbers from 0 to $10*2^\mu-1$ may be respectively allocated to slots within one wireless frame. The time resource may be distinguished by at least one of a wireless frame number (also referred to as a wireless frame index), a subframe number (also referred to as a subframe index), and a slot number (or a slot index).

Figure 2:
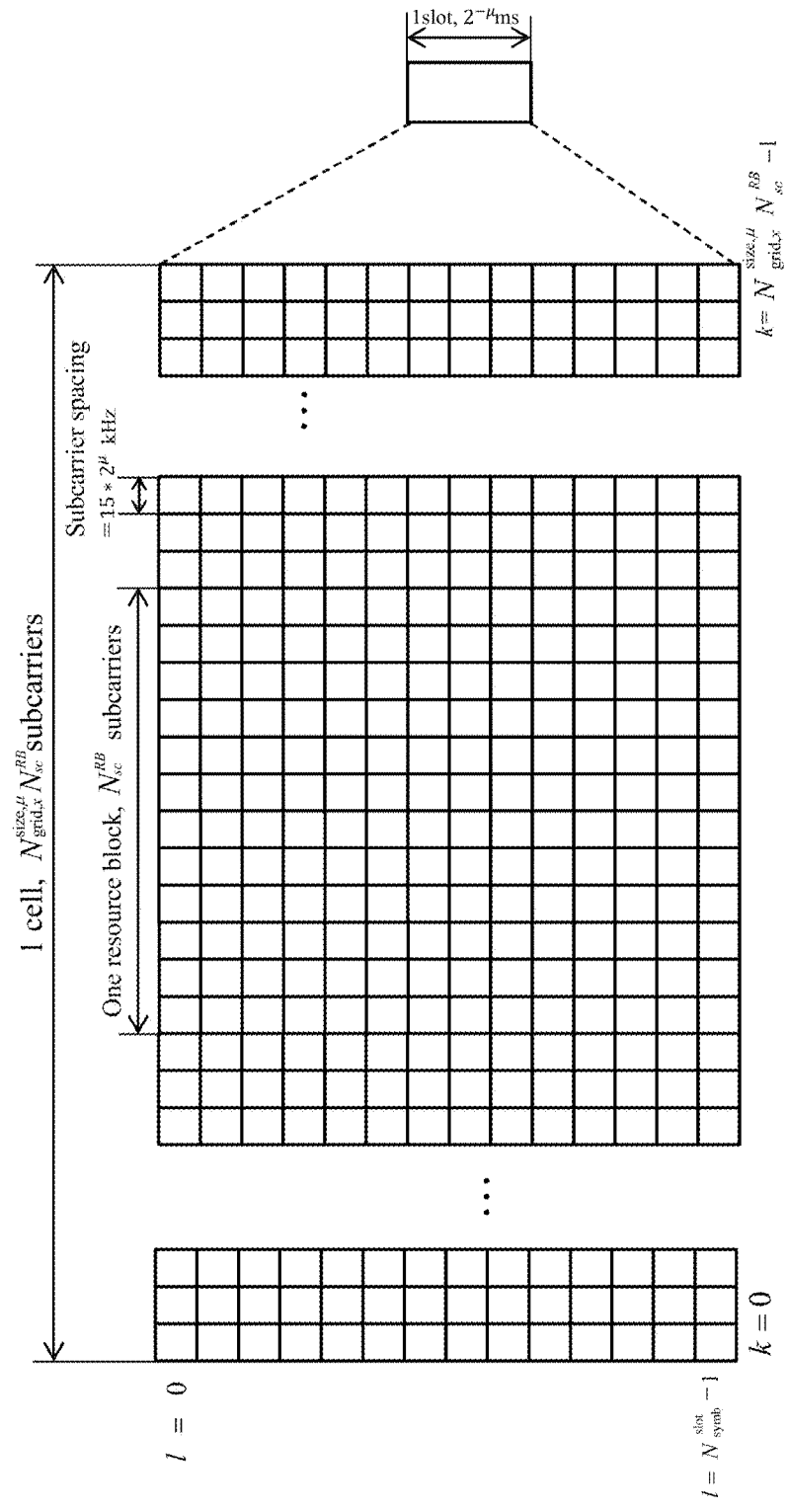
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system. There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 successive subcarriers in a frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent μ (xis DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e.g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, 1) in one slot. k may be an index assigned from 0 to $N^{size,\mu}_{grid,x}*N^{RB}_{sc}-1$ in the frequency domain, and 1 may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal cannot change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

Figure 3:
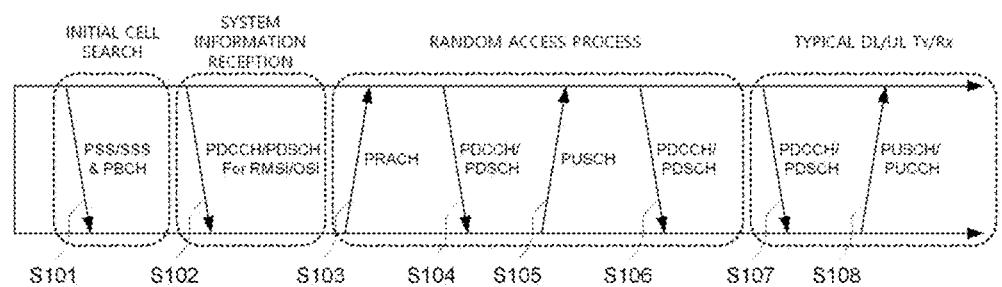
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the B S in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102).

Here, the system information received by the user equipment is cell-common system information for the user equipment to correctly operate in a physical layer in radio resource control (RRC), and is referred to as remaining system information or system information block (SIB).

When the UE initially accesses the base station or does not have radio resources for signal transmission, the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The user equipment may obtain terminal-specific system information required for the user equipment to correctly operate in a physical layer in an RRC layer during a random access process. When the user equipment obtains the terminal-specific system information from the RRC layer, the user equipment enters an RRC connected mode.

The RRC layer is used to generate and manage a message between the user equipment and a radio access network (RAN). In more detail, the base station and the user equipment may perform, in the RRC layer, broadcasting of cell system information required for all user equipments in a cell, management of transfer of a paging message, mobility management and handover, measurement report of the user equipment and a control therefor, and storage management including user equipment capability management and device management. In general, since update of a signal transferred in the RRC layer (hereinafter, RRC signal) is longer than a transmission/reception period (i.e., transmission time interval (TTI)) in a physical layer, the RRC signal may be maintained for a long period without being changed.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

FIG. 4 illustrates an SS/PBCH block for initial cell access in a 3GPP NR system. When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Figure 4A:
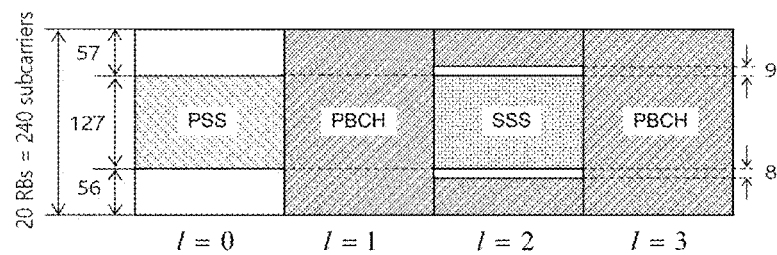
FIGS. 4A and 4B illustrate an SS/PBCH block for initial cell access in a 3GPP NR system.

Referring to FIG. 4A, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4A and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 1

| Channel or signal | OFDM symbol number 1 relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$d_{PSS}(n)=1-2x(m)$ $m=(n+43N_{ID}^{(2)})\bmod 127$ $0 \leq n < 127$

Here, $x(i+7)=(x(i+4)+x(i))\bmod 2$ and is given as $[x(6)\ x(5)\ x(4)\ x(3)\ x(2)\ x(1)\ x(0)]=[1\ 1\ 1\ 0\ 1\ 1\ 0]$.
Further, the sequence dsss(n) of the SSS is as follows.

Figure 4B:
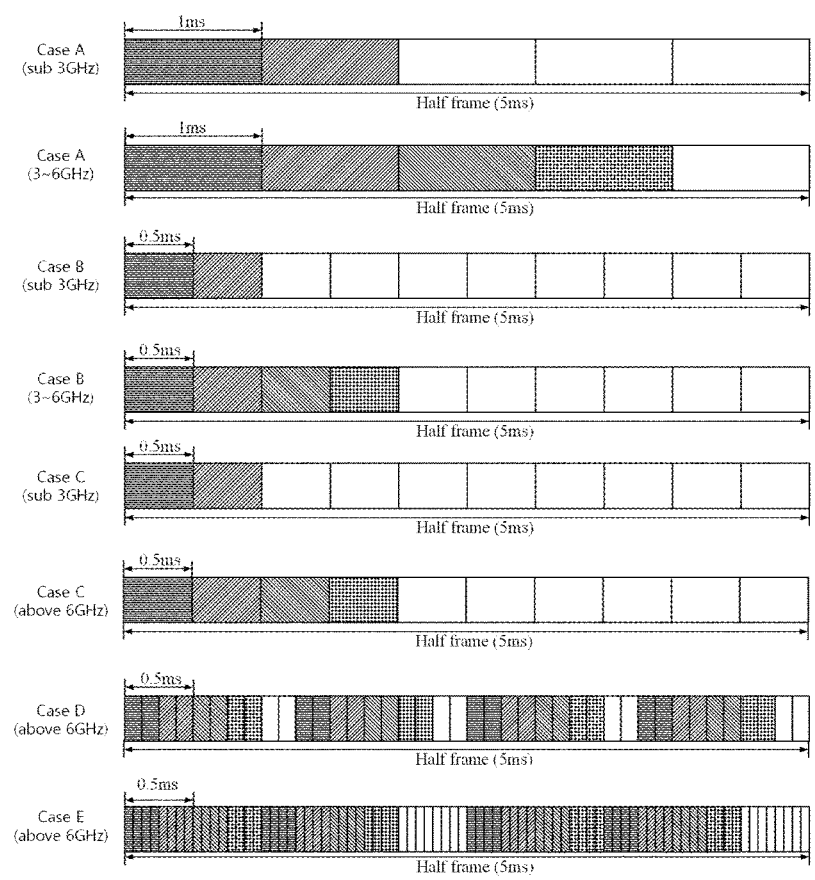

$d_{SSS}(n) = [1 - 2x_0((n + m_0)\bmod 127)][1 - 2x_1((n + m_1)\bmod 127)]$ $m_0 = 15\left\lfloor\frac{N^{(1)}_{ID}}{112}\right\rfloor + 5N^{(2)}_{ID}$ $m_1 = N^{(1)}_{ID}\bmod 112$ $0 \leq n < 127$ Here, $x_0(i+7)=(x_0(i+4)+x_0(i))\bmod 2$ $x_1(i+7)=(x_1(i+1)+x_1(i))\bmod 2$ and is given as $[x_0(6)\ x_0(5)\ x_0(4)\ x_0(3)\ x_0(2)\ x_0(1)\ x_0(0)]=[0\ 0\ 0\ 0\ 0\ 0\ 1][x_1(6)\ x_1(5)\ x_1(4)\ x_1(3)\ x_1(2)\ x_1(1)\ x_1(0)]=[0\ 0\ 0\ 0\ 0\ 0\ 1]$ A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5A:
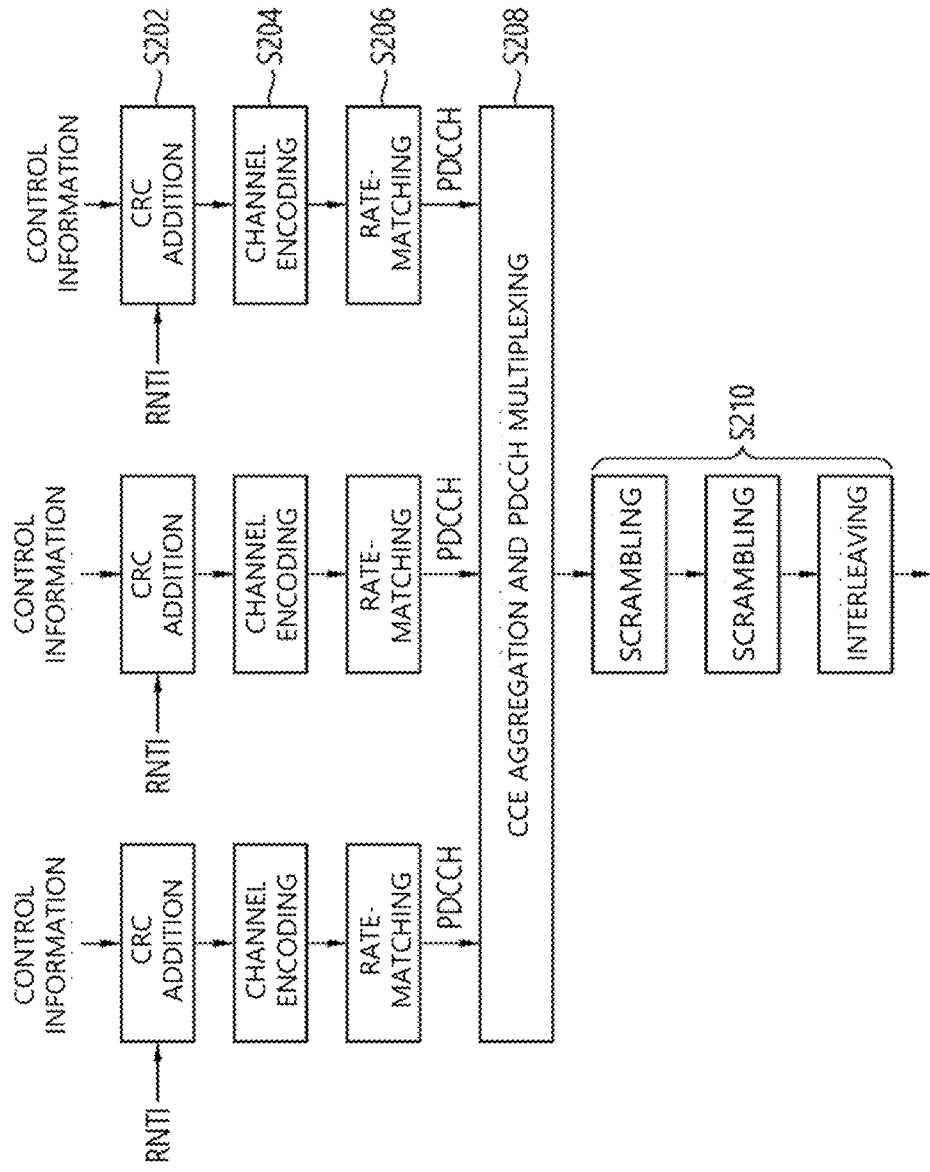
FIGS. 5A and 5B illustrate a procedure for transmitting control information and a control channel in a 3GPP NR system.
Figure 5B:
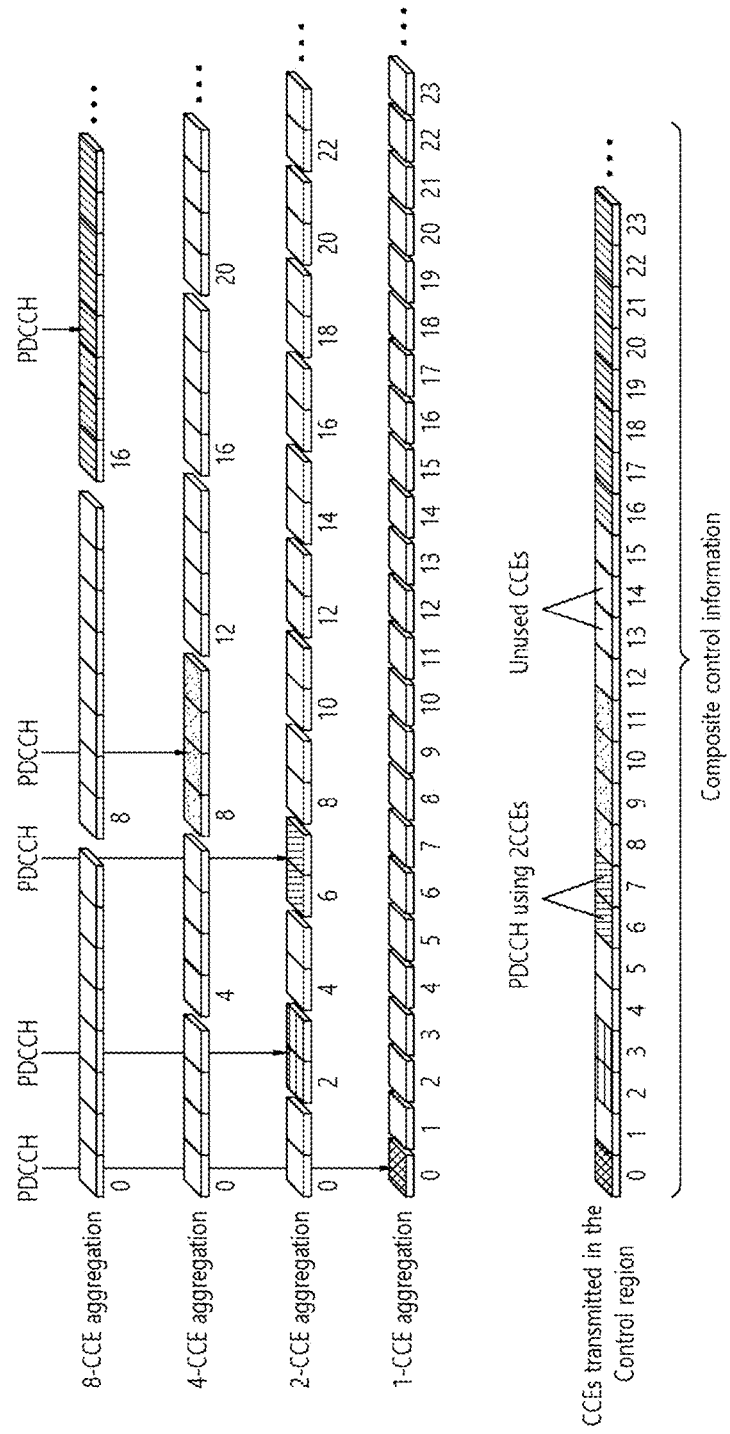

FIG. 5 illustrates a procedure for transmitting control information and a control channel in a 3GPP NR system. Referring to FIG. 5A, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
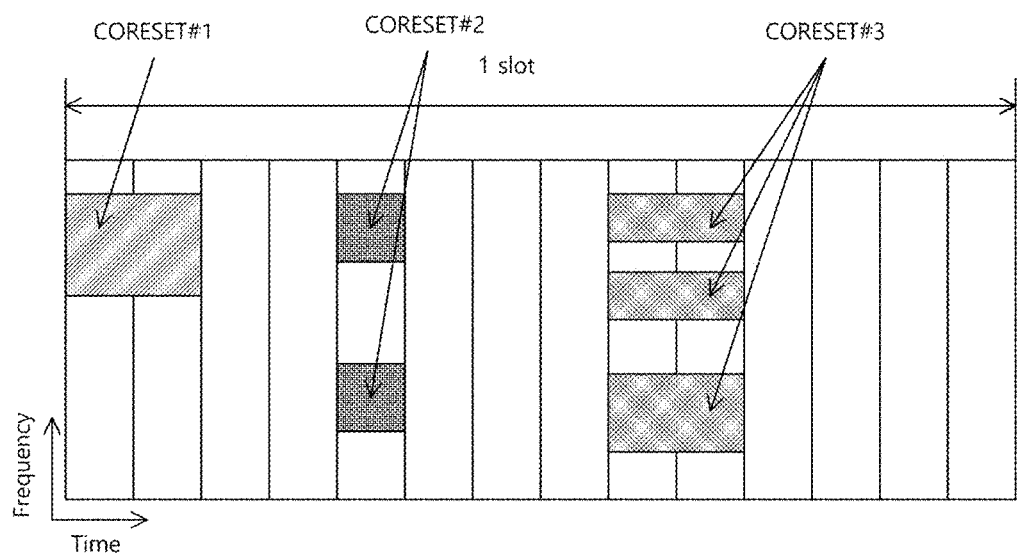
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system. The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
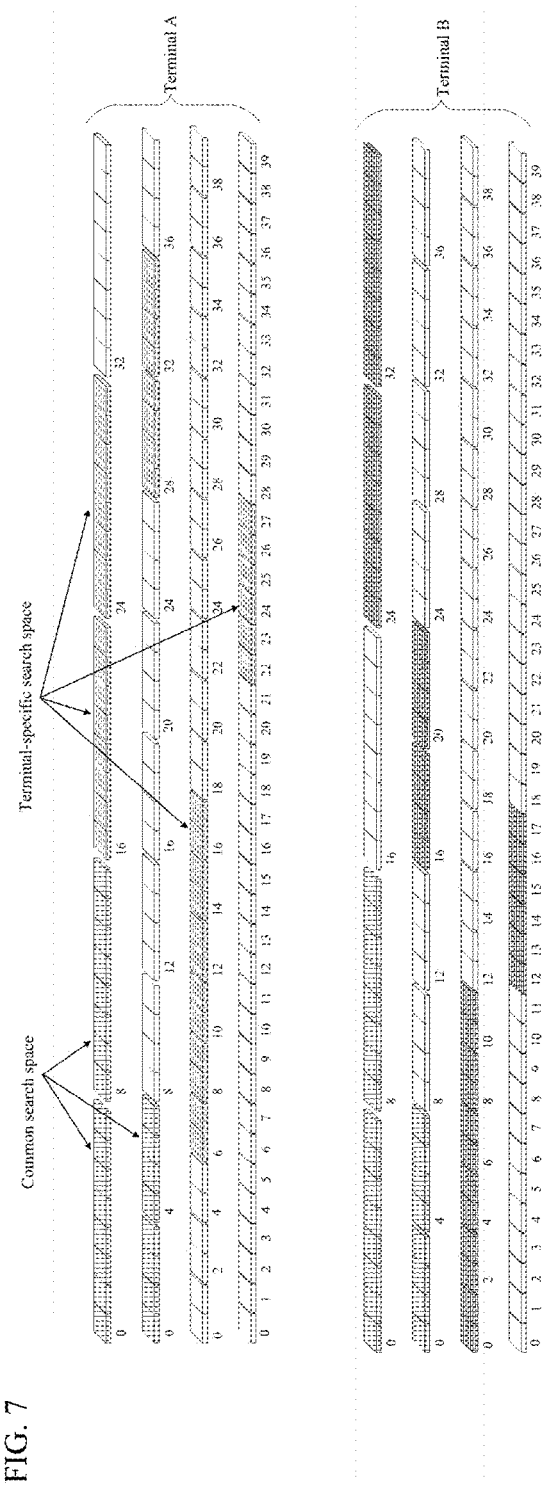
FIG. 7 illustrates a method for configuring a PDCCH search space in a 3GPP NR system.

FIG. 7 illustrates a method for setting a PUCCH search space in a 3GPP NR system. In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a Terminal-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted through a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 2

| PUCCH format | Length in OFDM symbols | Number of bits |
|---|---|---|
| 0 | 1-2 | ≤2 |
| 1 | 4-4 | ≤2 |
| 2 | 1-2 | >2 |
| 3 | 4-14 | >2 |
| 4 | 4-14 | >2 |

PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format for transferring 1-bit or 2-bit HARQ-ACK information or SR. PUCCH format 0 may be transmitted through one or two OFDM symbols on the time axis and one PRB on the frequency axis. When PUCCH format 0 is transmitted through two OFDM symbols, the same sequence on the two symbols may be transmitted through different RB. Here, the sequence may be a sequence cyclic-shifted (CS) from a base sequence used in PUCCH format 0. In this manner, the user equipment may obtain a frequency diversity gain. In detail, the user equipment may determine a cyclic shift (CS) value $m_{cs}$ according to Mbit bit UCI ($M_{bit}$=1 or 2). Furthermore, a sequence obtained by cyclic-shifting a base sequence having a length of 12 on the basis of the determined CS value $m_{cs}$ may be mapped to one OFDM symbol and 12 REs of one RB so as to be transmitted. When the number of cyclic shifts available for the user equipment is 12 and $M_{bit}$=1, 1 bit UCI 0 and 1 may be mapped to two cyclic-shifted sequences having a cyclic shift value difference of 6. Furthermore, when Mbit =2, 2-bit UCI 00, 01, 11, and 10 may be respectively mapped to four cyclic-shifted sequences having a cyclic shift value difference of 3.

PUCCH format 1 may deliver 1-bit or 2-bit HARQ-ACK information or SR. PUCCH format 1 maybe transmitted through consecutive OFDM symbols on the time axis and one PRB on the frequency axis. Here, the number of OFDM symbols occupied by PUCCH format 1 may be one of 4 to 14. More specifically, UCI, which is Mbit=1, may be BPSK-modulated. The UE may modulate UCI, which is Mbit=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , d($M_{symbol}$−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI (Mbit>2) with π/2-Binary Phase Shift Keying (BPSK) or QPSK to generate a complex valued symbol d(0) to d($M_{symb}$−1). Here, when using π/2-BPSK, $M_{symb}=M_{bit}$, and when using QPSK, $M_{symb}$=M/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, the user equipment may perform transmission/reception using a bandwidth that is smaller than or equal to the bandwidth of a carrier (or cell). To this end, the user may receive a configuration of bandwidth part (BWP) configured with a partial continuous bandwidth of the bandwidth of a carrier. The user equipment which operates according to TDD or operates in an unpaired spectrum may receive a configuration of up to four DL/UL BWP pairs in one carrier (cell). Furthermore, the user equipment may activate one DL/UL BWP pair. The user equipment which operates according to FDD or operates in a paired spectrum may receive a configuration of up to four DL BWPs in a downlink carrier (or cell) and a configuration of up to four UL BWPs in an uplink carrier (or cell). The user equipment may activate one DL BWP and UL BWP for each carrier (or cell). The user equipment may not receive or transmit on a time-frequency resource except for activated BWP. The activated BWP may be referred to as active BWP.

The base station may indicate an activated BWP among BWPs configured for the user equipment through downlink control information (DCI). A BWP indicated through DCI is activated, and other configured BWP(s) are deactivated. In a carrier (or cell) operating according to TDD, the base station may add a bandwidth part indicator (BPI) indicating a BWP to be activated to the DCI that schedules PDSCH or PUSCH in order to change a DL/UL BWP pair of the user equipment. The user equipment may receive the DCI that schedules PDSCH or PUSCH, and may identify a DL/UL BWP pair to be activated on the basis of the BPI. In the case of a downlink carrier (or cell) operating according to FDD, the base station may add a BPI indicating a BWP to be activated to the DCI that schedules PDSCH in order to change a DL BWP of the base station. In the case of an uplink carrier (or cell) operating according to FDD, the base station may add a BPI indicating a BWP to be activated to the DCI that schedules PUSCH in order to change a UL BWP of the base station.

Figure 8:
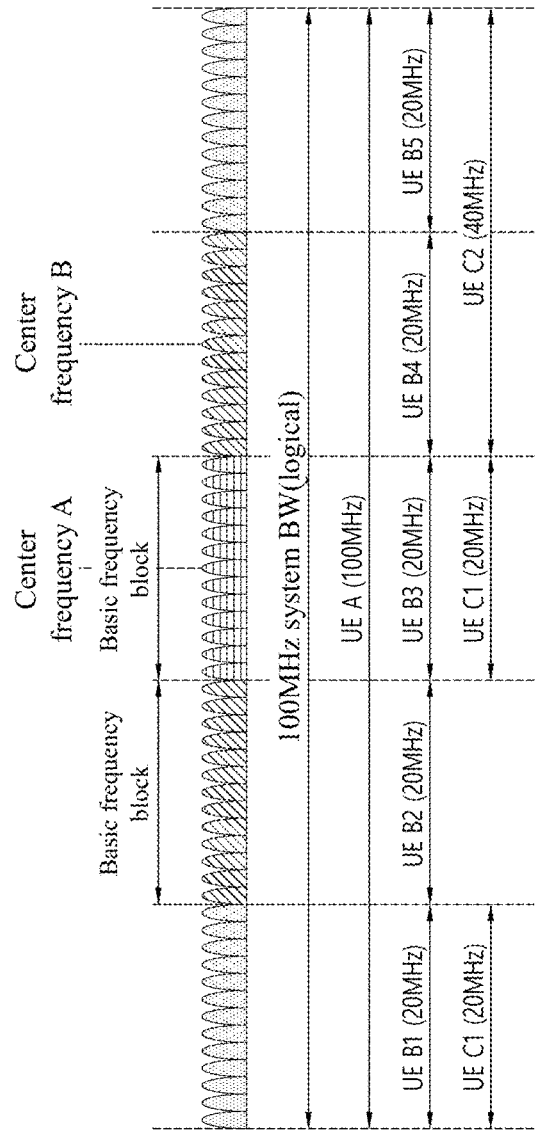
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1 \sim B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
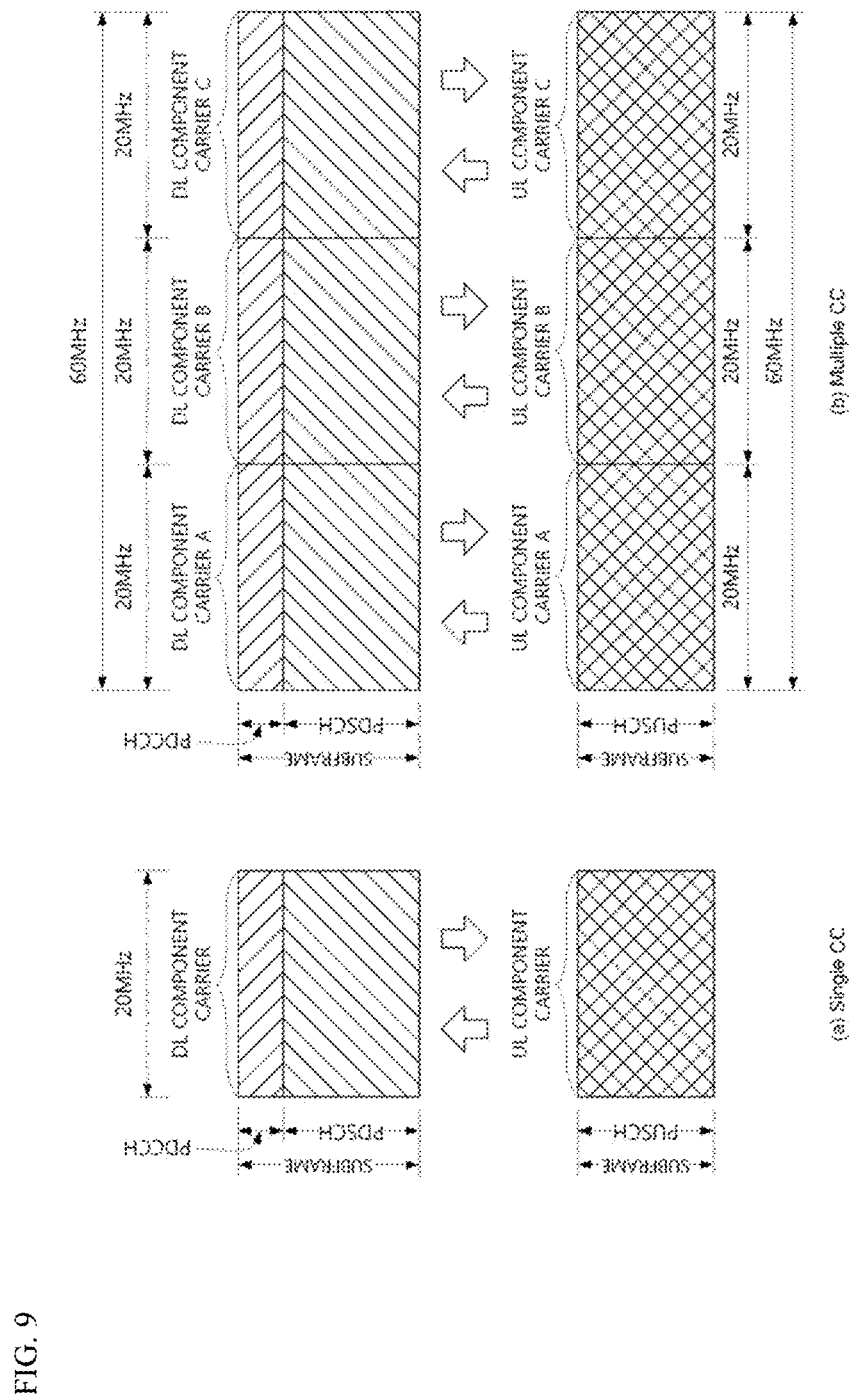
FIG. 9 is a diagram for explaining signal carrier communication and multiple carrier communication.

FIG. 9 is a drawing for explaining signal carrier communication and multiple carrier communication. Particularly, FIG. 9A shows a single carrier subframe structure and FIG. 9B shows a multi-carrier subframe structure.

Referring to FIG. 9A, in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9B, three 20 MHz component carriers (CCs) can be aggregated into each of UL and DL, so that a bandwidth of 60 MHz can be supported. Each CC may be adjacent or non-adjacent to one another in the frequency domain. FIG. 9B shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs may not be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PS-cell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
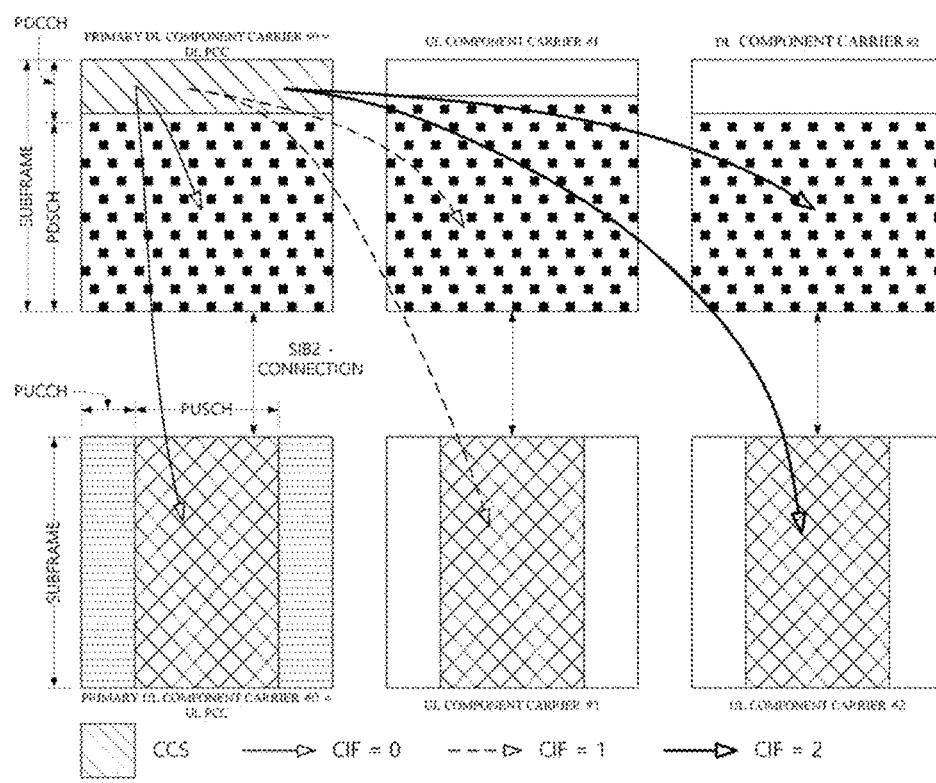
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
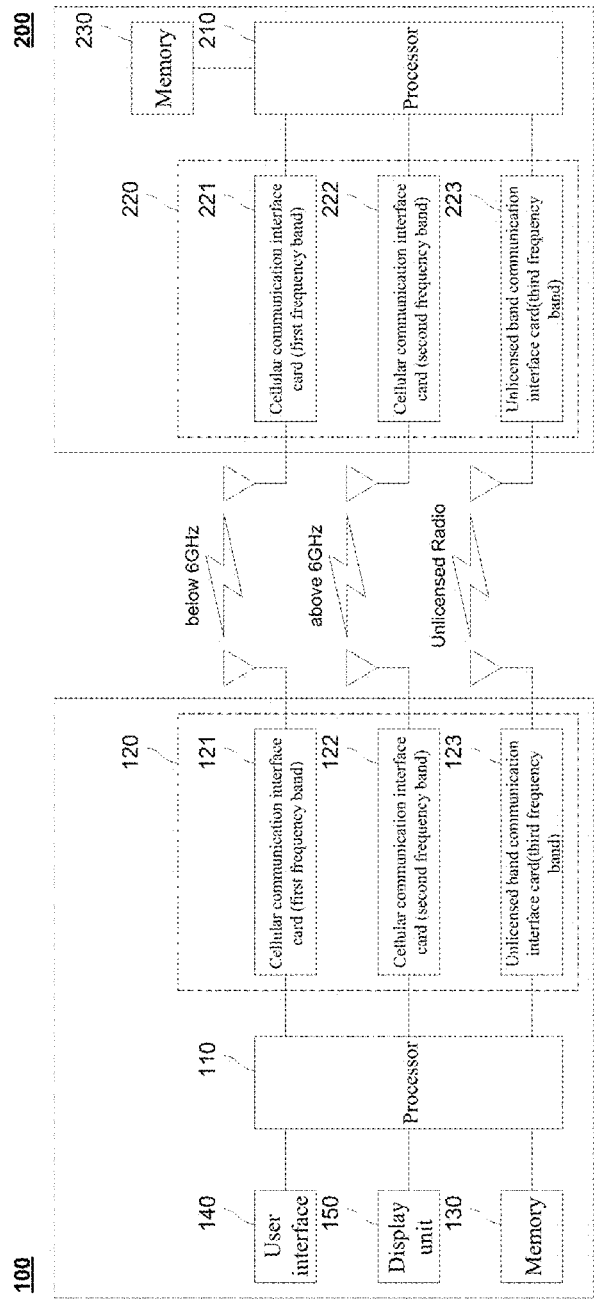
FIG. 11 is a block diagram illustrating configuration of a user equipment and a base station according to an embodiment of the present invention.

FIG. 11 is a block diagram showing the configurations of a UE and a base station according to an embodiment of the present disclosure. In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the base station 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the base station 100, an external device, and a server in accordance with the cellular communication standards or protocols in the frequency bands less than 6 GHz supported by the corresponding NIC module.

The cellular communication interface card 222 may transmit or receive a radio signal with at least one of the base station 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the base station 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

In the NR wireless communication system, the user equipment may transmit a codebook including hybrid automatic repeat request (HARQ)-ACK information to signal whether reception of a downlink signal or channel has succeeded. The HARQ-ACK codebook includes one or more bits indicating whether reception of a downlink signal or channel has succeeded. Here, the downlink channel may include at least one of a physical downlink shared channel (PDSCH), a semi-persistence scheduling (SPS) PDSCH, and a PDCCH for releasing the SPS PDSCH. The HARQ-ACK codebook may be divided into a semi-static HARQ-ACK codebook (or first-type codebook) and a dynamic HARQ-ACK codebook (or second-type codebook). The base station may set one of the two HARQ-ACK codebooks for the user equipment. The user equipment may use a HARQ-ACK codebook set for the user equipment.

When the semi-static HARQ-ACK codebook is used, the base station may use an RRC signal to configure the number of bits of the HARQ-ACK codebook and information for determining which downlink signal or channel is successfully received by each bit of the HARQ-ACK codebook. Therefore, it is not necessary for the base station to signal information required for transmitting the HARQ-ACK codebook to the user equipment each time transmission of the HARQ-ACK codebook is necessary.

When the dynamic HARQ-ACK codebook is used, the base station may signal information required for generating the HARQ-ACK codebook through a PDCCH (or DCI). In detail, the base station may signal the information required for generating the HARQ-ACK codebook through a down assignment index (DAI) field of a PDCCH (or DCI). In a specific embodiment, a DAI represents information about the number of bits of the HARQ-ACK codebook and about for which channel or signal each bit of the HARQ-ACK codebook indicates reception success or failure. The user equipment may receive the DAI field through a PDCCH (or DCI) for scheduling a PDSCH. A value of the DAI field may be divided into a counter-DAI and a total DAI. The total-DAI indicates the number of downlink signals or channels for which reception success or failure is indicated through the HARQ-ACK codebook until a current monitoring occasion (MO). The counter-DAI indicates a HARQ-ACK codebook bit indicating reception success or failure of downlink signals or channels among the downlink signals or channels for which reception success or failure is indicated through the HARQ-ACK codebook until a current cell of a current monitoring occasion. A PDCCH (or DCI) for scheduling a PDSCH may include a value of the counter-DAI corresponding to a scheduled PDSCH. Furthermore, a PDCCH (or DCI) for scheduling a PDSCH may include a value of the total-DAI corresponding to a scheduled PDSCH. The user equipment may determine the number of bits of the dynamic HARQ-ACK codebook on the basis of information signaled by a PDCCH (or DCI). In detail, the user equipment may determine the number of bits of the dynamic HARQ-ACK codebook on the basis of the DAI of a PDCCH (or DCI).

Configured Grant

Figure 12:
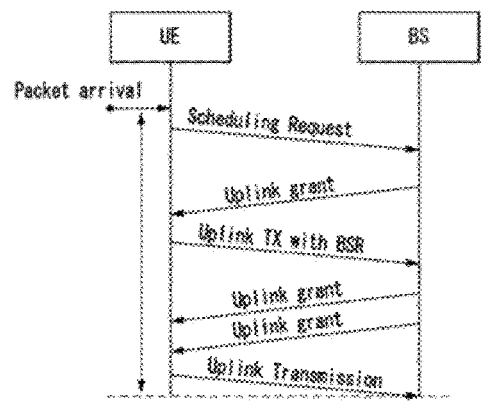
FIG. 12 is a diagram illustrating an example of an uplink grant to which an embodiment of the present invention can be applied.
Figure 12:
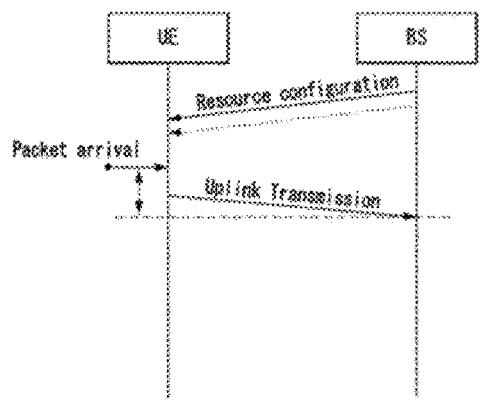

FIG. 12 is a diagram illustrating an example of an uplink grant to which an embodiment of the present invention can be applied.

FIG. 12(*a*) illustrates an example of a dynamic grant, FIG. 12(*b*) illustrates an example of a configured grant.

Hereinafter, in the present invention, for convenience, uplink transmission using the dynamic grant is referred to as grant-based uplink transmission, and uplink transmission using a UL configured grant without the dynamic grant (grant-free) is referred to as grant-free uplink transmission. However, these are exemplary and the present invention is not limited thereto.

The dynamic grant refers to a method for transmitting/receiving data based on scheduling of a base station in order to maximize resource utilization. This means that when a user equipment has data to be transmitted, the user equipment is able to first request the base station to allocate uplink resources and transmit data using only the uplink resources allocated from the base station. In order to efficiently use uplink radio resources, the base station has to know what kind of data and how much data to be transmitted in the uplink for each user equipment. Accordingly, the user equipment may directly transmit, to the base station, information on the uplink data to be transmitted, and the base station may allocate uplink resources to the user equipment based on the information. In this case, the information on the uplink data transmitted from the user equipment to the base station indicates the volume of uplink data buffered in its own buffer, which is referred to as a buffer status report (BSR). The BSR is transmitted using a MAC Control Element when the user equipment is allocated resources on the PUSCH in the current TTI and a reporting event is triggered.

FIG. 12(a) illustrates a process of allocating uplink resources for actual data by a user equipment when uplink radio resources for buffer status reporting to are not allocated to the user equipment. That is, in the case of a user equipment that switches the state from a discontinuous reception (DRX) mode to the active mode, since there is no pre-allocated data resource, resources for uplink data have to be requested starting with SR transmission through a PUCCH, and in this case, an uplink resource allocation procedure of 5 steps is used.

As shown in FIG. 12(a), when the user equipment is not allocated a PUSCH resource for transmitting a BSR, the user equipment first transmits a scheduling request (SR) to the base station in order to receive the PUSCH resource allocation. The scheduling request is used to request the base station to allocate PUSCH resources for uplink transmission by the user equipment when the user equipment is not scheduled for radio resources on the PUSCH in the current TTI, although a reporting event has occurred. That is, when a regular buffer status report (regular BSR) is triggered but the user equipment does not have uplink radio resources for transmitting the BSR to the base station, the user equipment transmits the SR on the PUCCH.

Depending on whether the PUCCH resource for SR is configured, the user equipment transmits the SR through the PUCCH or initiates a random access procedure. Specifically, the PUCCH resource in which the SR is able to be transmitted may be configured by an upper layer (e.g., RRC layer) specifically for the user equipment.

The SR configuration includes an SR transmission period (SR periodicity) and SR subframe offset information.

When the user equipment receives the UL grant for the PUSCH resource for BSR transmission from the base station, the user equipment transmits the triggered BSR to the base station through the PUSCH resource allocated by the UL grant.

The base station checks the actual volume of data to be transmitted through the uplink by the user equipment through the BSR, and transmits, to the user equipment, the UL grant for the PUSCH resource for actual data transmission. The user equipment that has received the UL grant for actual data transmission transmits actual uplink data to the base station through the allocated PUSCH resource.

A method for transmitting a PUSCH using the configured grant will be described with reference to FIG. 12(b).

The user equipment receives a resource configuration for transmission of UL data from the base station without the dynamic grant. The resource configuration may be performed only by RRC signaling (Type 1), or may be performed by layer-1 (L1) signaling and RRC signaling (Type 2).

In the case of Type 1, the following parameters can be received and configured by RRC.
Period and offset for SFN=0
Power control parameters
Time/frequency resource allocation
DMRS parameter/MCS/TBS
Number of repetitive transmissions K
In the case of Type 2, the following parameters may be received and configured by RRC.
Period
Power control parameters
Number of repetitive transmissions K
In addition, in the case of Type 2, the following items may be indicated by L1 signaling.
Offset for initial transmission timing
Time/frequency resource allocation
DMRS parameter/MCS/TBS
In addition, the user equipment performs initial transmission to the base station based on resource configuration received through RRC signaling through L1 signaling without the dynamic grant. In this case, the initial transmission may be repeated, and the initial transmission for the same transport block may be repeated K times (K>1).

Resources for initial transmission by the configured grant may or may not be shared among one or more user equipments.

When the initial transmission by the configured grant fails, the base station may transmit, to the user equipment, the dynamic grant for retransmission for the TB related to the initial transmission. In this case, the base station needs to identify the user equipment even if a collision occurs. The base station may identify the user equipment that performing UL transmission without the uplink dynamic grant based on time/frequency resources and reference signal (RS) parameters.

The base station may allocate different DMRS resources and parameters to different user equipments sharing the same resource. In addition, when the user equipment performs retransmission, the user equipment is switched to the dynamic grant basis, receives the dynamic grant from the base station, and performs retransmission based on the dynamic grant. That is, the user equipment performs initial transmission without the dynamic grant, but performs retransmission based on the dynamic grant.

Figure 13:
FIG. 13 is a diagram illustrating an example of a grant-free initial transmission.

FIG. 13 is a diagram illustrating an example of a grant-free initial transmission.

Referring to FIG. 13, the uplink resource of the configured grant for PUSCH transmission is configured as being semi-static by configuredGrantConfig of the BWP-UplinkDedicated information element (IE) transmitted by RRC signaling and the PUSCH transmission corresponding to the configured grant, and the following parameters may be applied to allocate uplink resources of the configured grant depending on a transmission type.

When the upper layers do not deliver the transport block for transmission on the resource allocated for uplink transmission without the dynamic grant, the user equipment may not perform any transmission on the resource configured by configuredGrantConfig.

In the case of Type 1 PUSCH transmission for the configured grant

In the case of Type 1 PUSCH transmission for the configured grant, the base station may configure the following information in the user equipment through an RRC signal.

Upper layer parameter timeDomainAllocatio value m: it indicates a row index m+1 of a matrix indicating an allocated table, and the allocated table indicates a combination of a start symbol, a length, and a PUSCH mapping type. Here, table selection follows a rule for a user equipment-specific search space.

Frequency domain resource allocation is determined by the upper layer parameter frequencyDomainAllocation according to the procedure for a given resource allocation type indicated by reousrceAllocation.

MCS is provided by the upper layer parameter mcsAndTBS.

The number of DMRS groups, DMRS ports, SRS resource indicator, DMRS sequence initialization are determined by DCI formats for scheduling of the PUSCH, and the antenna port value, the bit value for the DMRS sequence initialization, precoding information and the number of layers, and the SRS resource indicator are individually provided by antennaPort, dmrs-SeqInitialization, precodingAndNumberOfLayers, and srs-ResourceIndicator respectively.

When frequency hopping is enabled, the frequency offset between the two frequency hops is configured by the upper layer parameter frequencyHoppingOffset.

In the case of Type 2 PUSCH transmission for the configured grant

In the case of Type 2 PUSCH transmission for the configured grant, resource allocation is based on the UL grant received on the DCI.

Repetition of transport blocks for uplink transmission for the configured grant

The upper layer configuration parameters repK and repK-RV define K repetitions to be applied to the transmitted transport block and a pattern of redundancy version (RV) to be applied to K repetitions.

If the parameter repK-RV is not provided in configuredGrantConfig, the RV for uplink transmission for the configured grant is set to 0. If the parameter repK-RV is provided in configuredGrantConfig, the RV sequence may be configured according to repK-RV. The RV of the n-th (n=1, 2, . . . , K) transmission occasion among K repetitions is the (mod(n-1, 4)+1)-th value in the configured RV sequence. When configured to be repetitively transmitted K times in the configured grant, the initial transmission of the transport block may start at the following time point.

If the configured RV sequence is {0, 2, 3, 1}, the first transmission time point among K repetitions.

If the configured RV sequence is {0, 3, 0, 3}, any one time point associated with RV=0 during K repetitive transmissions.

If the configured RV sequence is {0, 0, 0, 0}, any one time point of the K repetitive transmissions, here if K is '8', the last transmission time point is excluded.

In the case of the RV sequence, the repetitive transmission may be stopped after K repetitive transmissions, or may be stopped at the time point that comes first, of the last transmission time point among K repetitions during a period P and a start point of repetition overlapping with the PUSCH having the same HARQ process scheduled in DCI format 0_0 or 0_1.

The user equipment does not expect that the time interval for K repetitive transmissions set to be larger than the time interval derived by the period P. If the user equipment determines the number of symbols available for the PUSCH transmission in a slot for the transmission occasion to be smaller than the number of symbols in the transmission interval, the user equipment does not transmit the PUSCH at the transmission occasion.

For Type 1 and Type 2 PUSCH transmissions for the configured grant, when the value of repK is set to be greater than 1, the user equipment has to repetitively transmit TB over successive slots according to the repK value by applying the same symbol allocation in each slot.

Type 1 or Type 2 PUSCH transmission for the configured grant in the slot may be omitted depending on the condition of the slot configuration.

Figure 14:
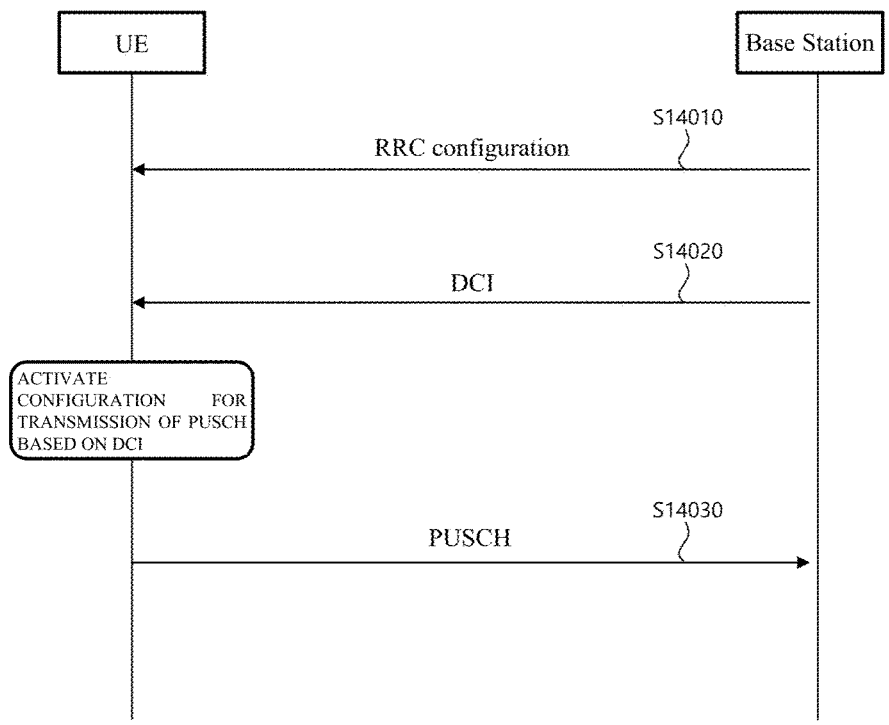
FIG. 14 is a flowchart illustrating an example for transmitting and receiving a physical uplink shared channel (PUSCH) according to an embodiment of the present invention.

Referring to FIG. 14, a user equipment (UE) receives RRC configuration information including information for receiving downlink control information (DCI) from a base station (S14010).

For example, the RRC configuration information may include information related to a control resource set (CORESET) and a search space for the user equipment to detect a PDCCH including downlink control information. In this case, the information related to the control resource set may include at least one of an identifier (ID) of the control resource set by which the user equipment is able to detect the PDCCH including the DCI, a control channel element (CCE) configuration information, a length (duration) of the control resource set, or frequency resource information. In this case, the information related to the search space may include at least one of an identifier (ID) of the search space by which the user equipment is able to detect the PDCCH including the DCI, a format of the DCI that may be detected in each search space, a detection duration, or resource information.

In addition, as described in FIGS. 12 and 13, the RRC configuration information may include parameters for configuration according to each type (Type 1, Type 2) of the configured grant.

Then, the user equipment may receive the DCI by detecting the PDCCH at a monitoring occasion based on the RRC configuration information (S14020). The user equipment may acquire the DCI by detecting the PDCCH in a specific search space of the monitoring occasion according to the type of service and/or data based on the RRC configuration information.

In this case, DAI included in the DCI may be configured with different bits depending on the format of the DCI. For example, in DCI Format 1_0, the DAI may be configured with 2 bits, and in DCI Format 1_1, the DAI may be configured with 1 bit in the case of a semi-static HARQ-ACK codebook, and may be configured with 2 bits in the case of a dynamic-HARQ-ACK codebook.

Table 3 below shows an example of DAI bits according to the DCI formats.

TABLE 3

| | Counter-DAI | Total DAI | UL DAI |
|---|---|---|---|
| DCI format 0_0 | — | — | — |
| DCI format 0_1 | — | — | For TB-based transmission 2 bits<br>For CBG transmission 4 bits (2 bits for TB-based reception, 2 bits for CBG-based reception) |
| DCI format 0_2 | — | — | if DownlinkassignmentindexForDCIFormat0_2 is not configured,<br>0 bit<br>Otherwise,<br>for TB-based reception 2 bits<br>for CBG-based reception 4 bits (2 bits for TB-based reception, 2 bits for CBG-based reception) |
| DCI format 1_0 | 2 bits | 0 bits | — |
| DCI format 1_1 | 2 bits | 2 bits | — |
| DCI format 1_2 | if DownlinkassignmentindexForDCIFormat1_2 is not configured, 0 bit<br>Otherwise 1 or 2 bits | if DownlinkassignmentindexForDCIFormat1_2 is not configured, 0 bit<br>Otherwise 0 bit or 2 bits | — |

In addition, the user equipment may be allocated resources for reception of a PDSCH or transmission of a PUSCH through the PDCCH (or DCI).

If different transmission blocks (TB) are transmitted at regular intervals through the PUSCH using repeatedly configured resources based on the configured grant, information for resource configuration may be included in the DCI depending on the type, and an identifier for activation of a configuration related to the configured resource may be further included.

That is, an indicator indicating the configuration to be activated for the transmission of the PUSCH may be included in the DCI and transmitted to the user equipment.

Then, the user equipment may activate at least one configuration for the transmission of the PUSCH by using the indicator included in the received DCI, and may transmit the PUSCH to the base station through resources allocated at regular intervals based on the activated configuration (S14030).

Alternatively, when the user equipment receives the PDSCH from the base station, the user equipment may generate a HARQ-ACK codebook indicating ACK/NACK of the received PDSCH based on the DAI value included in the PDCCH (or DCI) scheduling the PDSCH, and may include the generated HARQ-ACK codebook in uplink control information (UCI) and transmit it to the base station. In this case, the PUSCH may be repetitively transmitted between slots through resources allocated through the DCI.

In order to transmit the PUSCH, a symbol allocated from the base station through the DCI may be allocated to the user equipment through the location of the start symbol, the length of the allocated resource, and the number of repetitions.

Figure 15:
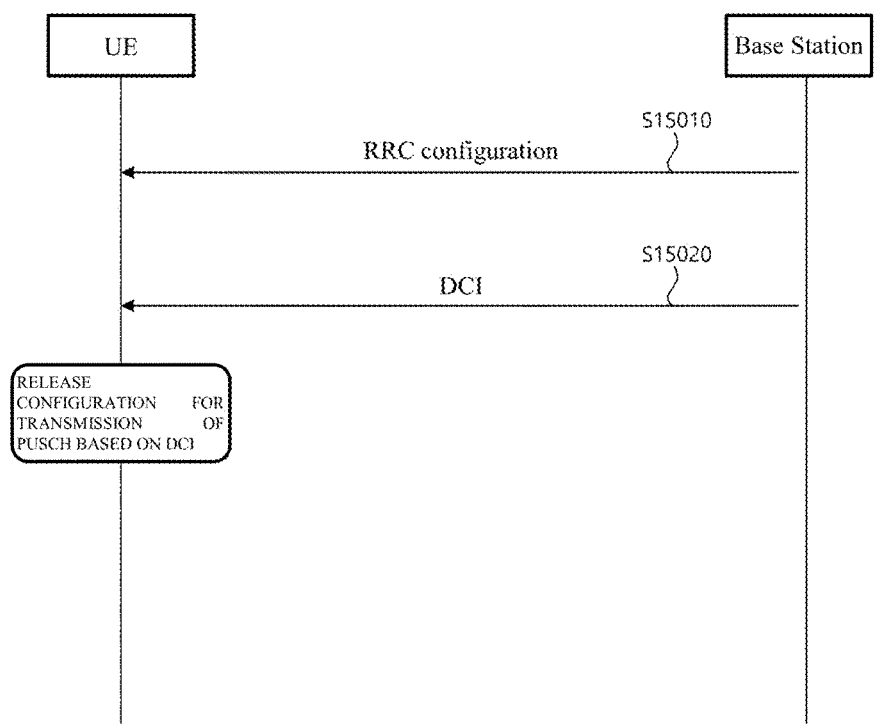
FIG. 15 is a flowchart illustrating an example for releasing a configuration for transmission of a PUSCH according to an embodiment of the present invention.

FIG. 15 is a flowchart illustrating an example for releasing a configuration for transmission of a PUSCH according to an embodiment of the present invention.

Referring to FIG. 15, a user equipment may release a configuration activated for the transmission of the PUSCH based on an identifier included in DCI.

Specifically, the user equipment may include RRC configuration information for releasing the activated configuration from the base station while performing the configured grant-based PUSCH transmission through the method described in FIG. 14 (S15010). The RRC configuration information may include an identifier for identifying each resource to be released, for release of activated configurations for the transmission of the PUSCH.

In this case, the identifier may be an identifier of each of the configurations that are released among the configurations activated for two types of configured grants, or an identifier of each of the configurations that are released among the configurations that are activated for semi-persistent scheduling (SPS).

Then, the user equipment may receive a PDCCH including DCI for indicating release of the activated configuration from the base station (S15010). In this case, the DCI may include a specific indicator indicating a group of the configurations to be released. For example, when one configuration is activated, the DCI may not include the specific indicator, and when a plurality of configurations are activated, the DCI may include the specific indicator indicating the configuration or configuration group to be released. In this case, when the specific indicator indicates a configuration group, the configuration group may include configurations to be released, which are included in the RRC configuration information.

If the RRC configuration information for releasing the configuration that is configured is not received, the user equipment may recognize that a specific indicator of DCI indicates a configuration included in the RRC configuration information described in FIG. 14. That is, if the RRC configuration information for release is not received, the user equipment may recognize that the specific indicator indicates the resource corresponding to the same value as that of the indicator indicating the configuration included in the RRC configuration information for the configuration of transmission of the PUSCH in step S14010 of FIG. 14.

In other words, if RRC configuration information for release is not provided, the user equipment may recognize that the specific indicator for release of the configuration indicates a configuration configured for the transmission of the PUSCH.

The specific indicator may be used to release a plurality of configurations activated for the transmission of the PUSCH, and the user equipment may release a plurality of configurations indicated by one specific indicator.

In this case, the specific indicator may be transmitted through a HARQ process number field. The user equipment may obtain a specific indicator from the HARQ process number field. When the HARQ process number field is used for resource release, determination may be made as to whether DCI is valid through fields other than the HARQ process number field.

The user equipment may recognize configurations to be released through the specific indicator included in the received DCI, and may release one or more recognized configurations.

As described in the previously configured grant, the user equipment may be configured to receive a PDSCH configured by an RRC signal (or configured by an RRC signal and activated with an L1 signal). This may be referred to as semi-persistent scheduling (SPS) or configured scheduling (CS). On the other hand, when an SPS/CS-based PDSCH/PUSCH is received/transmitted, DCI corresponding to the PDSCH/PUSCH does not exist.

Therefore, when SPS/CS is configured, the user equipment does not receive the corresponding DCI even if it receives/transmits the PDSCH/PUSCH. Therefore, even if the PDSCH/PUCH is received/transmitted, the timer configured for the user equipment may be increased, and when the timer reaches a predetermined value, the default DL BWP may be switched.

That is, the user equipment may be switched to the default DL BWP in spite of the fact that there is the PDSCH/PUSCH configured with the RRC signal (or configured with the RRC signal and activated with the L1 signal).

<Proposal 1: Group RBs, and indicate resources allocated to the user equipment through MV indicating the starting RBG index and length>

Method 1: RBs are grouped using a common RB index, and the set of grouped RBGs may be indicated to the user equipment by the starting index and length of the RBGs.

Figure 16:
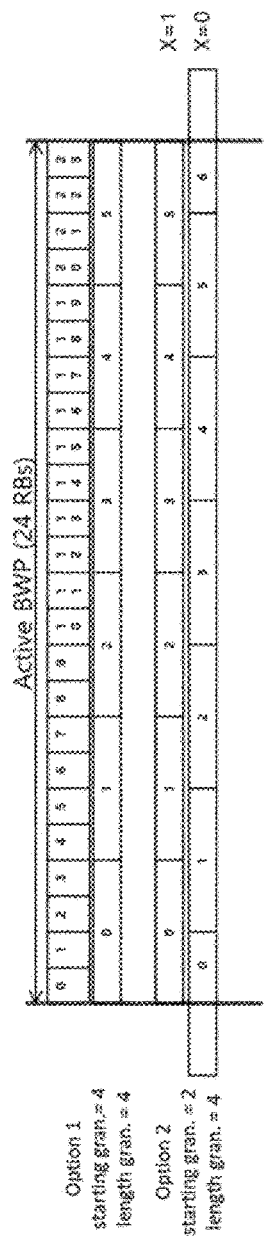
FIG. 16 is a diagram illustrating an example of a method for grouping resource blocks according to an embodiment of the present invention.

FIG. 16 is a diagram illustrating an example of a method for grouping resource blocks according to an embodiment of the present invention.

Referring to FIG. 16, multiple RBs may be grouped to form an RB group (RBG) in order to indicate frequency domain resource assignment with a small number of bits to a user equipment using URLLC. Grouped RBGs may be indicated through an RIV scheme.

The user equipment may be configured with a specific value (e.g., P value) related to the number of grouped RBs from a base station. The user equipment may obtain N RBG RBGs using the P value. When grouping RBGs, RBs may be grouped by P from the PRB having the lowest index value of the active BWP (lowest PRB) at all times. However, this method may not be aligned with the RBG of a user equipment having a different BWP.

Therefore, in order to resolve this situation, RBGs may be bundled using a common PRB index, as shown in FIG. 16. Here, the common PRB index is an index which, when the PRB corresponding to the PRB index 0 is set from the base station, is assigned from the PRB. Therefore, it is a PRB index that user equipments of the cell use the same.

Specifically, one RBG may be composed of RBs having a common PRB index of {P*n, P*n+1, . . . , P*n+P−1}. Here, n is a non-negative integer.

In this case, RBs included in RBGs have to be included in active BWP.

The user equipment may acquire S, which is the index of the starting RBGs of grouped RBGs, and L, which is the number of RBGs, by using the RIV value. Specifically, the MV may be obtained through Equation 1 as follows.

$$RIV = N_{RBG}*(L-1)+S, \text{ if } (L-1)<\text{floor}(N_{RBG}/2), \text{ and}$$

$$RIV = N_{RBG}*(N_{RBG}-L+1)+(N_{RBG}-1-S), \text{ if } (L-1)>\text{floor}(N_{RBG}/2),$$

where $S+L<N_{RBG}$. [Equation 1]

In another embodiment of the present invention, the user equipment may be configured with the P value as a unit of a length for bundling RBGs and a Q value as a unit of starting an RBG, from the base station. That is, the user equipment may be configured with the P value indicating the number of RBs grouped into RBGs and the Q value indicating the starting RB of RBs grouped into RBGs, from the base station. Here, the P and Q values may be the same or different.

The user equipment may create the RBG by grouping RBs using the P and Q values. First, Q may always be limited to one of the divisors of P, and P may have one of values corresponding to the power of 2, such as 2, 4, 8, and 16. For example, if the value of P is 4, the value of Q may be set to one of 1, 2, or 4. In this case, when it is assumed that K (K is a natural number) is P/Q, the user equipment may create K RBG sets by bundling RBGs using the common PRB index as follows.

First RBG set: One RBG is composed of RBs with a common PRB index of {P*n, P*n+1, . . . , P*n+P−1}

Second RBG set: One RBG is composed of RBs with a common PRB index of {P*n+Q, P*n+Q+1, . . . , P*n+Q+P−1}

Third RBG set: One RBG is composed of RBs with a common PRB index of {P*n+2*Q, P*n+2*Q+1, . . . , P*n+2*Q+P−1}

. . . k-th RBG set: One RBG is composed of RBs with a common PRB index of {P*n+(k−1)*Q, P*n+(k−1)*Q+1, . . . , P*n+(k−1)*Q+P−1}

. . . K-th RBG set: One RBG is composed of RBs with a common PRB index of {(P*n+(K−1)*Q, P*n+(K−1)*Q+1, . . . , P*n+(K−1)*Q+P−1}

As another method, RBGs may be grouped using a UE-specific PRB index as follows to generate K RBG sets.

First RBG set: One RBG is composed of RBs with a UE-specific PRB index of {P*n, P*n+1, . . . , P*n+P−1}

Second RBG set: One RBG is composed of RBs with a UE-specific PRB index of {P*n+Q, P*n+Q+1, . . . , P*n+Q+P−1}

Third RBG set: One RBG is composed of RBs with a UE-specific PRB index of {P*n+2*Q, P*n+2*Q+1, . . . , P*n+2*Q+P−1} k-th RBG set: One RBG is composed of RBs with a UE-specific PRB index of {P*n+(k−1)*Q, P*n+(k−1)*Q+1, . . . , P*n+(k−1)*Q+P−1}

. . . K-th RBG set: One RBG is composed of RBs with a UE-specific PRB index of {P*n+(K−1)*Q, P*n+(K−1)*Q+1, . . . , P*n+(K−1)*Q+P−1}. For reference, among {P*n+(K−1)*Q, P*n+(K−1)*Q+1, . . . , P*n+(K−1)*Q+P−1}, only RBs included in active BWP may be composed of RBGs. The RBG set is composed of P RBs, and the index of the first RB of the two RBG sets differs by a multiple of the value of Q. RBGs may be composed of only RBs included in the active BWP. That is, if some of the grouped RBs are not included in the active BWP, the RBG may be grouped with the remaining RBs excluding RBs that are not included.

The RBG of the grouped RBGs, which is allocated to the user equipment, may be indicated to the user equipment through resource allocation information in the frequency domain for the user equipment through two steps as follows.

1) First, information indicating a set allocated to the user equipment may be included in the DCI. For example, DCI may indicate the RBG set to be used by the user equipment from among K RBG sets, with X=ceil(log 2(K)) bits. For example, as shown in FIG. 16, when K is 2, X may be 1 bit. In this case, if the value of X is '0', the first RBG set may be indicated to the user equipment, and if '1', the second RBG set may be indicated to the user equipment.

2) The user equipment may obtain the index value S of the starting RBG of RBGs allocated to the user equipment from the RBG set and the length L of the RBGs by using the RIV value. That is, the user equipment may obtain S indicating the index of the RBG from which allocated RBGs start by using the MV value included in the DCI and L indicating the number (or length) of the allocated RBGs.

In this case, the MV value may be determined through Equation 2 below. Here, $N_{RBG,x}$ is the number of RBGs included in the RBG set indicated in the first step.

$$RIV = N_{RBG,x}*(L-1)+S, \text{ if } (L-1) \le \text{floor}(N_{RBG,x}/2), \text{ and}$$

$$RIV = N_{RBG,x}*(N_{RBG,x}-L+1)+(N_{RBG,x}-1-S), \text{ if } (L-1) > \text{floor}(N_{RBG,x}/2),$$

$$\text{where } S+L \le N_{RBG,x}. \quad \text{[Equation 2]}$$

As another method, the MV value may be determined through Equation 3 below. In this case, $N_{RBG,max}$ means the largest value among the numbers of RBGs included in all RBG sets.

$$RIV = N_{RBG,max}*(L-1)+S, \text{ if } (L-1) < \text{floor}(N_{RBG,max}/2), \text{ and}$$

$$RIV = N_{RBG,max}*(N_{RBG,max}-L+1)+(N_{RBG,max}-1-S), \text{ if } (L-1) > \text{floor}(N_{RBG,max}/2),$$

$$\text{where } S+L \le N_{RBG,x}. \quad \text{[Equation 3]}$$

The numbers of RBGs included in different RBG sets may be the same or different.

The user equipment has to determine the bit size of a frequency domain resource assignment (FDRA) field indicating the RIV value. For example, since the length (bit size) of the FDRA field may be composed of RBs including the most RBGs, the user equipment has to know the bit size of the FDRA field. For example, the bit size of the FDRA field may be ceil(log 2($N_{RBG,max}*(N_{RBG,max}+1)/2$)), and $N_{RBG,max}$ means the largest value among the numbers of RBGs included in all RBG sets.

In other words, when a grant scheduled by DCI of a specific type (e.g., DCI format 1_2) is received, the RIV indicating resources allocated on the frequency domain included in the DCI may include a starting index and a length.

The starting index refers to the index of the starting RBGs of RBGs allocated to the user equipment, and the length may refer to the number of consecutively allocated RBGs.

Figure 17:
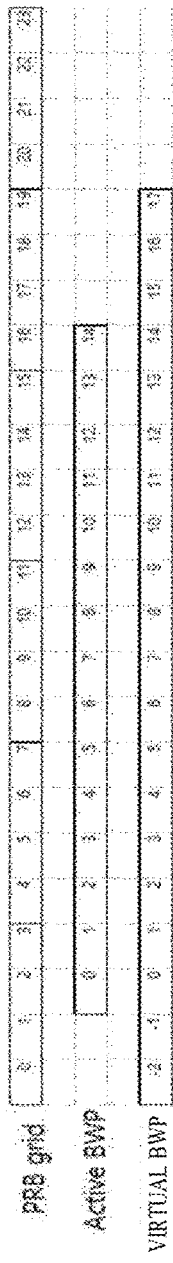
FIG. 17 is a diagram illustrating an example of a configuration of a bandwidth part (BWP) according to an embodiment of the present invention.

FIG. 17 is a diagram illustrating an example of a configuration of a bandwidth part (BWP) according to an embodiment of the present invention.

Method 2: RBGs allocated to the user equipment may be indicated using the RIV based on an offset.

Specifically, variables and parameters can be defined as follows.

P: Length granularity.
Q: Starting granularity.
K: P/Q.
RB_start: The index of the RB where the resources allocated in the frequency domain start.
L_RB: The number of RBs that are allocated resources.
RB_end: The index of the RB where the allocated resources end.

P is a multiple of Q, and RB_end may be a value obtained by subtracting 1 from the sum of RB_Start and L_RB (RB_end=RB_Start+L_RB).

First, the user equipment may receive an offset value of the starting RB with X=ceil(log 2(K)) bits. That is, the user equipment may receive the offset value of the starting RB from which the allocated resource starts through X bits of DCI.

The X bits may be acquired through the most significant bit (MSB) of the FDRA field of the DCI, or may be acquired through the MSB of MV of the FDRA field of the DCI. Alternatively, X bits may be bit values included in a separate field included in the DCI.

The user equipment may acquire S and L by using the RIV value included in the DCI. In this case, the MV value may be defined by Equation 4 below.

$$MV = N*(L-1)+S, \text{ if } (L-1) \le \text{floor}(N/2), \text{ and}$$

$$MV = N*(N-L+1)+(N-1-S), \text{ if } (L-1) > \text{floor}(N/2),$$

$$\text{where } S+L \le N. \quad \text{[Equation 4]}$$

In Equation 4, N denotes a quotient of a value obtained by dividing the number N_BWP of PRBs included in the active BWP by P. That is, N may be expressed as floor(N_BWP/P). This means that the active BWP is able to contain a maximum of N RBs with a length of P. S is one of 0, 1, ..., N−1, and L is one of 1, 2, ..., N.

The user equipment may calculate RB_Start and L_RB through Equation 5 below by using the offset, S, and L.

$$RB\_start = S*P + Offset$$

$$L\_RB = L*P \quad \text{[Equation 5]}$$

For example, when N_BWP is 15, P is 4, and Q is 1, 0 or 2 may be indicated as a 1 bit offset through DCI. In this case, the value of N may be 3, and possible combinations as the value of RIV are shown in Table 4 below.

TABLE 4

| offset | S | L | RB_start | L_RB | RB_end |
|---|---|---|---|---|---|
| 0 | 0 | 1 | 0 | 4 | 3 |
| 0 | 0 | 2 | 0 | 8 | 7 |
| 0 | 0 | 3 | 0 | 12 | 11 |
| 0 | 1 | 1 | 4 | 4 | 7 |
| 0 | 1 | 2 | 4 | 8 | 11 |
| 0 | 2 | 1 | 8 | 4 | 11 |
| 2 | 0 | 1 | 2 | 4 | 5 |
| 2 | 0 | 2 | 2 | 8 | 9 |
| 2 | 0 | 3 | 2 | 12 | 13 |
| 2 | 1 | 1 | 6 | 4 | 9 |
| 2 | 1 | 2 | 6 | 8 | 13 |
| 2 | 2 | 1 | 10 | 4 | 13 |

In such a method, even though the active BWP is composed of 15 RBs, the last RB (RB with an index of 14) is not able to be used for scheduling, and thus a waste of resources may occur in the frequency domain.

Therefore, to resolve this situation, the following method may be used.

First, the user equipment may receive the offset value of the starting RB with X=ceil(log 2(K)) bits. One of 0, Q, 2*Q, ..., (K−1)*Q values may be indicated as the offset value. The X bit may be acquired through the MSB of the FDRA field of the DCI or the MSB of the RIV of the FDRA field of the DCI. Alternatively, the X bit may be indicated through a separate field included in the DCI.

The user equipment may acquire S and L by using the RIV value included in the DCI. In this case, the MV value may be defined in the same manner as in Equation 4 above.

Here, N may be expressed as N=ceil(N_BWP/P). This means that the active BWP is able to include a maximum of N RBs the length of which is P, and additionally is able to include RBs of a size smaller than P. S is one of 0, 1, ..., N−1, and L is one of 1, 2, ..., N.

The user equipment may calculate RB_Start and L_RB through Equation 6 below by using the offset, S, and L.

RB_start=S*P+Offset

L_RB=L*P (if S*P+Offset+L*P<N_BWP)

L_RB=N_BWP-RB_start (if S*P+Offset+
    L*P<N_BWP)  [Equation 6]

For example, when N_BWP is 15, P is 4, and Q is 2, 0 or 2 may be indicated as a 1 bit offset through DCI. In this case, the value of N may be 4, and possible combinations as the value of MV are shown in Table 5 below.

TABLE 5

| offset | S | L | RB_start | L_RB | RB_end |
|---|---|---|---|---|---|
| 0 | 0 | 1 | 0 | 4 | 3 |
| 0 | 0 | 2 | 0 | 8 | 7 |
| 0 | 0 | 3 | 0 | 12 | 11 |
| 0 | 0 | 4 | 0 | 15 | 14 |
| 0 | 1 | 1 | 4 | 4 | 7 |
| 0 | 1 | 2 | 4 | 8 | 11 |
| 0 | 1 | 3 | 4 | 10 | 14 |
| 0 | 2 | 1 | 8 | 4 | 11 |
| 0 | 2 | 2 | 8 | 7 | 14 |
| 0 | 3 | 1 | 12 | 3 | 14 |
| 2 | 0 | 1 | 2 | 4 | 5 |
| 2 | 0 | 2 | 2 | 8 | 9 |
| 2 | 0 | 3 | 2 | 12 | 13 |
| 2 | 0 | 4 | 2 | 13 | 14 |
| 2 | 1 | 1 | 6 | 4 | 9 |
| 2 | 1 | 2 | 6 | 8 | 13 |
| 2 | 1 | 3 | 6 | 9 | 14 |
| 2 | 2 | 1 | 10 | 4 | 13 |
| 2 | 2 | 2 | 10 | 5 | 14 |
| 2 | 3 | 1 | 14 | 1 | 14 |

In this case, an effect of scheduling all RBs in the frequency band may be achieved.

In another embodiment of the present invention, an L_RB may be determined to match a PRB grid. The PRB grid is made by bundling several consecutive PRBs based on the common PRB index, which has been described above.

When the PRB grid groups A RBs, the common PRB index of the lowest PRB of the active BWP may be called BWP_low, and the common PRB index of the highest PRB of the active BWP may be called BWP_high.

First, when BWP_high is an integer multiple of A, if BWP_low is an integer multiple of A, RBs bundled by A in order from the lowest PRB in the active BWP may coincide with the PRB grid. However, if BWP_low is not an integer multiple of A, RBs bundled by A in order from the lowest PRB in the active BWP, the L_RB does not coincide with the PRB grid.

Therefore, if (BWP_low mod A) RBs are separately bundled from the lowest PRB and then RBs are bundled by A from the next, they may coincide with the PRB grid.

When BWP_high is not an integer multiple of A, A PRBs may not be left at the end of the last active BWP, and in this case, the remaining PRBs may be grouped.

Specifically, a total of M RBs of the active BWP may be grouped based on the PRB grid. Here, M=ceil((N_BWP+(BWP_low mod A))/A).

In the first grouping, A-(BWP_low mod A) RBs may be grouped, and in the last grouping, (BWP_low+N_BWP) mod A RBs may be grouped if (BWP_low+N_BWP) mod A>0, otherwise A RBs may be grouped.

A method for allocating frequency domain resources according to the PRB grid is as follows.

First, the user equipment may receive the offset value of the starting RB through X=ceil(log 2(K)) bits of the DCI. The offset value may be one of 0, Q, 2*Q, ..., (K−1)*Q values.

The X bit may be acquired through the MSB of the FDRA field of the DCI or the MSB of the MV of the FDRA field of the DCI. Alternatively, the X bit may be indicated through a separate field included in the DCI.

The user equipment may acquire S and L by using the RIV value included in the DCI. In this case, the MV value may be acquired through Equation 7 below.

MV=N*(L−1)+S (if (L−1)≤floor(N/2)),

MV=N*(N−L+1)+(N−1−S) (if (L−1)>floor(N/2)),

S+L<=N  [Equation 7]

When BWP_low+offset is a multiple of P and BWP_low+N_BWP+offset is a multiple of P, N=N_BWP/P.

However, if BWP_low+offset is a multiple of P, but BWP_low+N_BWP+offset is not a multiple of P, N=floor(N_BWP/P)+1. Alternatively, if BWP_low+offset is not a multiple of P and BWP_low+N_BWP+offset is not a multiple of P, N=floor(N_BWP/P)+2.

The active BWP is able to contain at most floor (N_BWP/P) RBs of length P based on the PRB grid, and additionally, a set of PBs with a length less than P will be composed of the lowest PRBs and highest PRBs of the BWP. S is one of 0, 1, ..., N−1, and L is one of 1, 2, ..., N.

The user equipment may calculate RB_Start and L_RB through Equation 8 below by using the offset, S, and L.

If S=0, R_start=offset,

If S>0, R_start=S*P+Offset−(BWP_low mod P),

L_RB=L*(P−1)+(P−(BWP_low mod P)) (if R_start+
    L*P BWP and S=0),

L_RB=L*P (if S>1),

L_RB=N_BWP-RB_start (if R_start+L*P>N_BWP)  [Equation 8]

As shown in FIG. 17, the virtual BWP may be composed of N*P RBs.

The virtual BWP may be aligned with the PRB grid, and the included RBs are {−delta+1, ... 0, ..., N*P+delta}. In this case, delta=BWP_low mod P.

Here, the lowest RBs with negative indexes and RBs with indexes greater than N*P are virtually included in the active BWP. The RB indexes of the virtual BWP is denoted by 0', 1', ..., (N*P−1)'. RB_start temp is the index of the starting RB among the RB indexes of the virtual BWP. This may be obtained by RB_start temp=(S*P+offset)' and L_RB temp=L*P. If RBs not included in the actual RBs among the virtual RBs are excluded (that is, excluding the lowest RBs with negative indexes and RBs with indexes equal to or higher than N*P), resource allocation in the actual active BWP may be acquired.

For example, when N_BWP is 15, P is 4, Q is 2, and the lowest PRB index BWP_low of the Active BWP is 2, the offset may be indicated by 0 or 2 using a 1-bit offset in the DCI. N may be obtained according to the offset.

In this case, possible combinations of RIV values are shown in Table 6 below.

TABLE 6

| offset | N | S | L | RB_start | L_RB | RB_end |
|---|---|---|---|---|---|---|
| 0 | 5 | 0 | 1 | 0 | 2 | 1 |
| 0 | 5 | 0 | 2 | 0 | 6 | 5 |
| 0 | 5 | 0 | 3 | 0 | 10 | 9 |
| 0 | 5 | 0 | 4 | 0 | 14 | 13 |
| 0 | 5 | 0 | 5 | 0 | 15 | 14 |
| 0 | 5 | 1 | 1 | 2 | 4 | 5 |
| 0 | 5 | 1 | 2 | 2 | 8 | 9 |
| 0 | 5 | 1 | 3 | 2 | 10 | 11 |
| 0 | 5 | 1 | 4 | 2 | 13 | 14 |
| 0 | 5 | 2 | 1 | 6 | 4 | 9 |
| 0 | 5 | 2 | 2 | 6 | 8 | 13 |
| 0 | 5 | 2 | 3 | 6 | 9 | 14 |
| 0 | 5 | 3 | 1 | 10 | 4 | 13 |
| 0 | 5 | 3 | 2 | 10 | 5 | 14 |
| 2 | 4 | 0 | 1 | 2 | 4 | 5 |
| 2 | 4 | 0 | 2 | 2 | 8 | 9 |
| 2 | 4 | 0 | 3 | 2 | 12 | 13 |
| 2 | 4 | 0 | 4 | 2 | 13 | 14 |
| 2 | 4 | 1 | 1 | 6 | 4 | 9 |
| 2 | 4 | 1 | 2 | 6 | 8 | 13 |
| 2 | 4 | 1 | 3 | 6 | 9 | 14 |
| 2 | 4 | 2 | 1 | 10 | 4 | 13 |
| 2 | 4 | 2 | 2 | 10 | 5 | 14 |
| 2 | 4 | 3 | 1 | 14 | 1 | 14 |

As described above, the base station may group the RBs and allocate resources to the user equipment in units of the RBG, and may transmit, to the user equipment, the DCI including the index and length information of the starting RBG of the allocated resources. In this case, the base station may additionally include the offset information on the starting RBG in the DCI and transmit the DCI.

The user equipment may perform repetitive transmission of the PUSCH by recognizing the allocated resources based on the DCI for resource allocation received from the base station.

Specifically, as described in Method 1 and/or Method 2, the user equipment may recognize resources for repetitive transmission of the PUSCH based on the index and length information of the starting RBG of the allocated resources included in the DCI transmitted from the base station. In this case, when the offset information is further included in the DCI, the allocated resources may be recognized by additionally using the offset information.

Then, the user equipment may repetitively transmit the PUSCH to the base station by using the recognized resources.

<Proposal 2: Release allocated resources for repetitive transmission of PUSCH by using one piece of DCI>

In another embodiment of the present invention, a base station may release resources allocated and activated for repetitive transmission of the PUSCH through DCI. In this case, the base station may release a plurality of resources activated through one piece of DCI at once.

That is, resources allocated for UL grant-free transmission or transmission using a configured grant may be released with one DCI.

General uplink transmission is a grant-based (GB) transmission in which the user equipment is configured to perform transmission on the corresponding resource according to the scheduling information of the grant received through the DCI of the PDCCH transmitted from the base station. In GB transmission, the base station configures a UL grant for uplink transmission as DCI and transmits the UL grant to the user equipment through a downlink control channel. The grant is a dynamic grant.

The user equipment may transmit, to the base station, the TB mapped to the HARQ process ID according to the HARQ process ID of the UL grant, through a time-frequency resource indicated by the UL grant. The user equipment may manage HARQ retransmission based on the UL grant having the same HARQ process ID. For example, the user equipment may check whether the previous TB has been successfully transmitted to the base station by comparing a new data indicator (NDI) indicating whether new data is indicated through the UL grant from the base station with the NDI of the previously received UL grant. That is, when the NDI of the received UL grant is a toggled value of the previously received NDI, the user equipment may determine that the previously transmitted TB has been successfully transmitted. However, if the NDI of the received UL grant is the same value as the previously received NDI, it is determined that the TB is not transmitted normally and transmission has failed, and a procedure for retransmission of the corresponding TB may be performed.

In uplink grant-free (GF) transmission, the user equipment does not receive a grant for uplink transmission from the base station when the user equipment has data to transmit to the base station, and the base station and the user equipment may be configured through the RRC configuration information in advance according to the corresponding configuration information, or the user equipment may transmit data to the base station through predefined time-frequency resources.

In this case, the time-frequency resources may be individually configured differently depending on the user equipment. The demodulation reference signal (DM-RS) used by the user equipment when transmitting GF may be configured differently depending on the user equipment. Accordingly, when performing uplink GF transmission, the user equipment may transmit the DM-RS and data configured for the user equipment to the base station by using the time-frequency resources configured for the user equipment.

In order to increase the reliability of uplink GF transmission, the base station may be configured to repetitively transmit uplink data to the user equipment. For example, if the base station is configured to repeatedly transmit data K times to the user equipment, the user equipment may repetitively transmit the data to the base station K times. In this case, the user equipment may repeatedly transmit the data K times or may end the repetitive transmission when receiving a response (ACK) to the uplink GF transmission from the base station.

When receiving uplink GF transmission, the base station may recognize which user equipment has performed uplink transmission on the GF resource through time-frequency resources and DMRS, but may fail to receive the data.

In this case, the user equipment may transmit a grant for retransmission of uplink data to the user equipment. If the user equipment receives the grant for retransmission of uplink data, the user equipment may stop GF transmission of the TB and may perform GB retransmission.

In Rel-16 NR, one BWP of one cell may include up to 12 UL configured grants. In this case, releasing the configuration of each UL configured grant using each DCI may have a limitation in that the overhead of the DCI increases.

To resolve this limitation, the configurations of two or more UL configured grants may be released with one DCI.

Method 1: The ID of the configured grant that is released through DCI may be indicated by grouping the ID of the configured grant.

In an embodiment of the present invention, when the base station configures a UL configured grant for uplink transmission for the user equipment, one group ID may indicate a plurality of UL configured grants by grouping individual UL configured grants.

Specifically, when configuring the UL configured grant for the user equipment, the base station may configure it such that an ID indicates IDs of two or more UL configured grants in specific values (e.g., 12, 13, 14, 15, or if X configured grants are configured, X, X+1, ..., X+15). For example, the ID of 12 may be configured such that the ID of the UL configured grant includes 0, 1, 2, and 3. That is, a specific value may be configured such that the ID indicates the configured grant that has been already configured, not a new UL configured grant.

When the user equipment receives the DCI for releasing the UL configured grant, the user equipment may receive the ID of the UL configured grant using four bits of the bits of the DCI. If the indicated ID is a specific value, a plurality of UL configured grants indicated by the specific value may be released at once.

That is, if the user equipment has a plurality of configurations through a plurality of configured grants for repetitive transmission of the PUSCH from the base station, it is possible to release a plurality of configurations through the DCI transmitted from the base station. In this case, the DCI may include a specific indicator indicating a plurality of configured grants (or resources). A specific indicator (or ID field) may indicate the IDs of one or more configured grants (or resources) configured for repetitive transmission of the PUSCH.

In this case, the ID of each configured grant to be released may be provided to the user equipment through the RRC configuration, and if there is no RRC configuration, the user equipment may determine that a specific indicator of the DCI corresponds to the IDs of the configured grants activated for repetitive transmission of the PUSCH.

The method described above may be used to activate one or more configured grants (or resources) for repetitive transmission of the PUSCH.

That is, the user equipment may receive the DCI for activating the UL configured grant, and may receive IDs of one or more configured grants to be activated using four bits of the bits of the DCI. The user equipment may perform repetitive transmission of the PUSCH by activating one or a plurality of configured grants corresponding to the ID received through the DCI.

In this case, a field consisting of 4 bits is required in order to indicate the ID of each of the plurality of configured grants released through one DCI. Therefore, the following fields may be used to indicate release of a plurality of configured grants.

HARQ process number field: The HARQ process number field is always 4 bits and is included in DCI formats 0_0 and 0_1.

Four bits among FDRA, TDRA, RV and/or MCS fields: Specifically, the first 1 bit of each field may be bundled and reused as 4 bits.

DCI format 0_0: The frequency hopping flag (1 bit), NDI (1 bit), and TPC command for scheduled PUSCH (2 bit) may be bundled and reused to indicate the configured grant to be released. Alternatively, if the frequency hopping flag is composed of 1 bit in DCI format 0_1, in the same way as the DCI format 0_0, the frequency hopping flag (1 bit), NDI (1 bit), and TPC command for scheduled PUSCH (2 bit) may be bundled and reused to indicate the configured grant to be released. If the frequency hopping flag is composed of 0 bits in DCI-format 0_1, 1 bit may be additionally used in another field. For example, 1 bit may be additionally used in a downlink assignment indicator (DAI) field. In this case, the DAI field is 1 bit or 2 bit.

For example, when the user equipment is configured with one or more UL configured grants (e.g., UL grant Type 2 PUSCH) from the base station through the DCI, the value of the HARQ process number field in the DCI format may indicate activation of the UL configured grant (or resource) corresponding to the same value as the value provided by RRC configuration information.

That is, each of the configuration values for each of the configured grants provided through higher layer signaling corresponds to the HARQ process number field of 4 bits included in the DCI, and the user equipment may activate one or more configured grants corresponding to the HARQ process number field.

In this case, validation of the DCI may be determined using a field other than the HARQ process number field. The user equipment may perform repetitive transmission of the PUSCH by using the activated resource.

When the user equipment is configured with one or more configured grants from the base station, one or more configured grants may be released using the following method.

If the user equipment is provided with the configuration (or list) of one or more configured grants released through higher layer signaling (e.g., RRC configuration information), the value of the HARQ process number field of the DCI format may indicate an item for scheduling release of the configuration of one or more UL configured grants. That is, the user equipment may release the configuration of one or more configured grants corresponding to the value of the HARQ process number field included in one DCI. In this case, the configuration of one or more configured grants to be released may be transmitted to the user equipment through higher layer signaling.

If the user equipment is not provided with the configuration (or list) of one or more configured grants released through higher layer signaling (e.g., RRC configuration information), the value of the HARQ process number field of the DCI format may indicate release of the UL configured grant for the same value as the index value for the configuration of one or more UL configured grants. That is, the user equipment may release the configuration of one or more configured grants corresponding to the value of the HARQ process number field included in one DCI. In this case, the configuration of one or more configured grants may be a configuration transmitted to the user equipment through higher layer signaling for the activation of the configured grants.

In this way, the base station may indicate, to the user equipment, activation/release grants for repetitive transmission of the PUSCH through one DCI, and the user equipment may activate/release a plurality of UL configured grants through the received DCI.

Method 2: The field for determining validation of the DCI to activate/release the configured grant (e.g., Type 2 configured grant) or the SPS PDSCH may vary according to the number of the configured Type 2 configured grants or PDSCHs.

Specifically, the bit field for determining the validation of DCI for activating/releasing the Type 2 configured grant or SPS PDSCH, which is Type 2 of the two types (Type 1, Type 2) of the configured grant, may vary case by case.

The base station may transmit DCI for activating/releasing Type 2 configured grant or SPS PDSCH to the user equipment. In this case, the DCI may be scrambled with CS-RNTI, and the value of the NDI field may be set to 0 and be transmitted.

In this case, values of fields for determining whether the DCI is valid for activation/deactivation of the configuration for repetitive transmission of the PUSCH are shown in Tables 7 and 8 below.

Table 7 shows an example of values of fields for determining validation of DCI for activating/releasing a single SPS configuration or a single configured grant when the single SPS configuration or the single configured grant is configured for downlink transmission.

TABLE 7

|  | DCI format 0_0/0_1/0_2 | DCI format 1_0/1_1/1_2 |
| --- | --- | --- |
| HARQ process number | set to all '0's | set to all '0's |
| Redundancy version | set to all '0's | set to all '0's |
| Modulation and coding scheme | set to all '1's | set to all '1's |
| Frequency domain resource assignment | set to all '1's | set to all '0's for FDRA Type 0 set to all '1's for FDRA Type 1 |

Table 8 shows an example of values of fields for determining validation of DCI for activating/releasing multiple SPS configurations or multiple configured grants when the multiple SPS configurations or the multiple configured grants are configured for downlink transmission.

TABLE 8

|  | DCI format 0_0/0_1/0_2 | DCI format 1_0/1_1/1_2 |
| --- | --- | --- |
| Redundancy version | set to all '0's | set to all '0's |
| Modulation and coding scheme | set to all '1's | set to all '1's |
| Frequency domain resource assignment | set to all '1's | set to all '0's for FDRA Type 0 set to all '1's for FDRA Type 1 |

Referring to Tables 7 and 8, depending on whether the SPS configuration or the configuration of the configured grant is single or multiple, the HARQ process number field may or may not be used for validation determination.

For example, when one or more (plural) configured grants are configured as described in Method 1 of Proposal 2, the HARQ process number field may be used to activate/release a plurality of configured grants that is configured. In this case, since the HARQ process number field has already been used to activate/release a plurality of configured grants, the HARQ process number field is not used to determine whether DCI is valid.

However, if one configured grant is configured, since the HARQ process number field may not be used to activate/release the configured grant, in this case, the HARQ process number field may be used to determine whether the DCI is valid.

In Tables 7 and 8, checking of DCI validation according to the value of the FDRA field may vary depending on the type of FDRA. For example, FDRA Type 0 refers to a type used to generate a group (RBG) by bundling RBs, and to indicate whether or not each of the generated RBGs is allocated with a bit map. In this case, it may mean that if all values of the FDRA field are set to 0, all grouped RBGs are not allocated. Therefore, in general, in FDRA Type 0, since the method in which all the bits of the FDRA field are set to 0 for the allocation of RBG may not be used, the user equipment may recognize that the received DCI is DCI for release when all bits of the FDRA field are set to 0.

In addition, FDRA Type 1 may indicate an MV, which is a value obtained by joint-coding the start and end of RBs through the DCI. In general, valid MV values may be set in advance, and a method in which all bits of the FDRA field are set to 1 may not be used.

Therefore, when the type of FDRA is set to FDRA Type 1, the user equipment may determine that the received DCI is DCI for release when all bit values of the FDRA field of the received DCI are 1.

In addition, when a dynamic switch is set between the FDRA types, the user equipment may recognize the FDRA type according to the MSB value of the FDRA field. For example, if the MSB of the FDRA field is 0, the type of FDRA may be determined as FDRA Type 0, and if the MSB is 1, the type of FDRA may be determined as FDRA Type 1.

When the dynamic switch is applied to determine the FDRA type as described above, it is difficult to use the configuration of the FDRA field described in Tables 7 and 8. In this case, determination may be made as to whether the DCI is valid using a method described below.

In the first embodiment, if the dynamic switch is set between FDRA types, the user equipment may determine that the received DCI is DCI for release when all bit values of the FDRA field are 0 or 1. That is, if the dynamic switch is set, the user equipment may determine that the received DCI is DCI for release if all bit values of the FDRA field are set to be equal to a specific value (0 or 1).

In the second embodiment, if the dynamic switch is set between the FDRA types, the user equipment may determine the values of the subsequent bits according to the MSB value of the FDRA field. For example, if the MSB of the FDRA field is 0, it may be determined that the FDRA type is FDRA Type 0. In this case, as described in Tables 7 and 8, if all bits other than the MSB are set to 0, the user equipment may determine that the received DCI is DCI for release.

For example, if the MSB of the FDRA field is 1, it may be determined that the FDRA type is FDRA Type 1. In this case, as described in Tables 7 and 8, if all bits other than the MSB are set to 1, the user equipment may determine that the received DCI is DCI for release.

In the third embodiment, when only FDRA Type 0 is configured in the user equipment, if all bit values of the FDRA field are 0, the user equipment may determine that the received DCI is DCI for release, and in other cases (e.g., FDRA type is not configured, or FDRA Type 1 or dynamic switch is set, and so on), if all bit values of the FDRA field are to set 1, the user equipment may determine that the received DCI is DCI for release.

Tables 9 and 10 below show an example of field values for determining the validation of DCI when the dynamic switch according to the first to third embodiments is set.

Table 9 shows an example of values of fields for determining validation of DCI for activating/releasing a single SPS configuration or a single configured grant when the single SPS configuration or the single configured grant is configured for downlink transmission.

TABLE 9

|  | DCI format 0_0/0_1/0_2 | DCI format 1_0/1_1/1_2 |
| --- | --- | --- |
| HARQ process number | set to all '0's | set to all '0's |
| Redundancy version | set to all '0's | set to all '0's |
| Modulation and coding scheme | set to all '1's | set to all '1's |
| Frequency domain resource assignment | set to all '0's for FDRA Type 2 with μ = 1 set to all '1's, other wise | set to all '0's for FDRA Type 0 or for dynamicSwitch set to all '1's, other wise |

Table 10 shows an example of values of fields for determining validation of DCI for activating/releasing multiple SPS configurations or multiple configured grants when the multiple SPS configurations or the multiple configured grants are configured for downlink transmission.

TABLE 10

|  | DCI format 0_0/0_1/0_2 | DCI format 1_0/1_1/1_2 |
| --- | --- | --- |
| Redundancy version | set to all '0's | set to all '0's |
| Modulation and coding scheme | set to all '1's | set to all '1's |
| Frequency domain resource assignment | set to all '0's for FDRA Type 2 with μ = 1 set to all '1's, other wise | set to all '0's for FDRA Type 0 or for dynamicSwitch set to all '1's, other wise |

Similarly, when the type of FDRA is not configured in the DCI format, the user equipment may determine that the received DCI is DCI for release if all bits of the FDRA field are set to '1'.

The user equipment may be configured with a plurality of SPS PDSCH configurations from the base station to support different service types. In this case, the user equipment may receive the DCI for SPS activation described above in order to activate one SPS PDSCH configuration among a plurality of SPS PDSCH configurations. In this case, the DCI for activation of the SPS configuration may be scrambled with CS-RNTI.

If the user equipment receives the DCI for activating the SPS configuration, the user equipment may determine an SPS PDSCH configuration to be activated among a plurality of SPS PDSCH configurations using a specific field of the received DCI. That is, when the user equipment is configured with the SPS PDSCH configuration from the base station, an ID corresponding to each configuration may also be configured, and among the configured IDs, an ID corresponding to the SPS PDSCH configuration to be activated may be received through the DCI.

In addition, the user equipment may receive DCI for releasing one of a plurality of PDSCH configurations or a plurality of SPS PDSCH configurations from the base station, and the DCI may be scrambled with CS-RNTI.

If the user equipment receives the DCI for release, the user terminal may determine the SPS PDSCH configuration to be released using a specific indicator or a specific field of the received DCI. That is, if the user equipment receives the DCI for releasing the SPS configurations, the user equipment may determine an SPS PDSCH configuration to be released among a plurality of SPS PDSCH configurations using a specific field of the received DCI. That is, when the user equipment is configured with the SPS PDSCH configuration from the base station, an ID corresponding to each configuration may also be configured, and among the configured IDs, an ID corresponding to the SPS PDSCH configuration to be activated may be received through the DCI.

In order to release a plurality of SPS PDSCH configurations, the user equipment may be configured with a group in which a plurality of IDs are bundled from the base station, and since the group ID is included in the DCI for release, the release of the SPS PDSCH configuration corresponding to the group ID may be indicated to the user equipment.

Hereinafter, when a plurality of SPS PDSCH configurations are configured for the user equipment, a method for transmitting HARQ-ACK of a plurality of SPS PDSCHs will be described.

In order to release a plurality of SPS PDSCH configurations, the DCI may require up to 4 bits, and the user equipment may indicate a group of the configuration to be released using a maximum of 4 bits of the DCI for release.

For example, a field for indicating the ID of the group may be obtained as follows.

First, the user equipment may indicate the release of the SPS PDSCH configuration through the DCI using the HARQ process number field. That is, the HARQ processor number field of the SPS release DCI may indicate the group ID to be released.

In this case, the size of the HARQ processor number field may be smaller than that of the group ID. That is, all group IDs may not be indicated by using the HARQ process number field.

In this case, the length of the HARQ process number field may be calculated as in Equation 9 below.

$$\text{Length of HARQ process number field} = \text{ceil}(\log 2(\max\{\text{\# of HARQ process}, \text{\# of group ID for SPS PDSCH}\})) \quad \text{[Equation 9]}$$

In Equation 9, # of HARQ process number is the number of HARQ processes configured for the user equipment, and # of group ID for SPS PDSCH is the number of group IDs of SPS PDSCHs configured for the user equipment.

As another method, when the length of the HARQ process number field is less than ceil(log 2(# of group ID)), the bit(s) corresponding to the difference between ceil(log 2(# of group ID)) and the length of the HARQ process number field may be obtained in another field of DCI.

For example, the bit(s) of the FDRA field, the bit(s) of the TDRA field, or the bit(s) of the MCS field or bit(s) of the RV field may be used.

The SPS PDSCH is a periodic transmission performed in downlink.

Similarly, there is a repetitive transmission of the configured grant (CG) PUSCH, which is a periodic transmission in the uplink described above.

In order to release a plurality of configured grant (CG) PUSCHs, a maximum of 4 bits of one DCI field may be used as described in Method 1. That is, the ID of the group to be released may be indicated using a maximum of 4 bits of the DCI.

In this case, the maximum 4 bits may be used in the same field as the 4 bits used in the method described in Method 1 or to release the SPS PDSCH described above. For example, the HARQ process number field of the DCI may be used to indicate the configured grant PUSCH to be released.

In this case, the length of the HARQ process number field may be calculated through Equation 10 below.

Length of HARQ process number field=ceil(log 2(max{# of HARQ process, # of group ID for CG PUSCH})) [Equation 10]

In Equation 10, # of HARQ process number is the number of HARQ processes configured for the user equipment, and # of group ID for CG PDSCH is the number of group IDs of CG PUSCHs configured for the user equipment. Further, in order to perform joint release of CG and joint release of SPS using the HARQ process number field, the length of the HARQ process number field may be obtained through Equation 11 below.

Length of the HARQ process number field=ceil(log 2(max{# of HARQ process, # of group ID for CG PUSCH, # of group ID for SPS PDSCH})). [Equation 11]

That is, the length of the HARQ process number field may be determined based on the maximum value among the number of HARQ processes, the group ID of the CG PUSCH, and the group ID of the SPS PDSCH.

In addition, the HARQ process number of the SPS PDSCH may be determined through Equation 12 as follows.

HARQ Process number=[floor (CURRENT_slot×10/ (numberOfSlotsPerFrame×periodicity))] modulo nrofHARQ-Processes [Equation 12]

In Equation 12, CURRENT_slot may be obtained through Equation 13 below.

CURRENT_slot=[(SFN×numberOfSlotsPerFrame)+ slot number in the frame] [Equation 13]

Each parameter in Equations 12 and 13 is as follows.
numberOfSlotsPerFrame: Number of slots in each frame
periodicity: Period of the SPS PDSCH
nrofHARQ-Processes: Number of HARQ processes for the user equipment
slot number in the frame: Slot number in the frame
SFN (system frame number): System frame number
periodicity and nrofHARQ-Process may be set from the upper layer, and numberOfSlotsPerFrame may be determined according to the subcarrier spacing. For example, if the subcarrier spacing is 15 kHz, it may be 10, if 30 kHz, it may be 20, if 60 kHz, it may be 40, and if 120 kHz, it may be 80. SFN denotes the number of the system frame. The HARQ process number as described above is suitable for one SPS PDSCH configuration, but not suitable for a plurality of SPS PDSCH configurations.

That is, the value that the HARQ process number is able to have is limited to 0, 1, . . . , nrofHARQ-Proces-1, and it is likely that different SPS PDSCHs have the same HARQ process number. To this end, when configuring the SPS PDSCH configuration, an offset value of the HARQ-Process may be additionally set.

In this case, the HARQ process number may be obtained by additionally using an offset value as shown in Equation 14 below.

HARQ Process number=[[floor (CURRENT_slot×10/ (numberOfSlotsPerFrame×periodicity))]modulo nrofHARQ-Processes]+Offset [Equation 14]

Through the set offset value, the HARQ process number may have values such as Offset, Offset+1, . . . , Offset+nrofHARQ-Process-1. That is, the HARQ process number of the SPS PDSCH may be made different from other numbers by using an offset value for each SPS PDSCH configuration.

In the present invention, the method for determining the HARQ process number of the SPS PDSCH using the set offset value has been described; however, the method is not limited to the SPS PDSCH. Even in the method for determining the HARQ process number of the PUSCH in the configured grant-based PUSCH transmission, the HARQ process number may use the set offset value. That is, in the grant-based PUSCH transmission, the HARQ process number of the PUSCH may be obtained by adding the offset to the value determined based on the number of slots (numberOfSlotsPerFrame), the system frame number (SFN), the number of HARQ processes (nrofHARQ-Processes), the period (periodicity).

Figure 18:
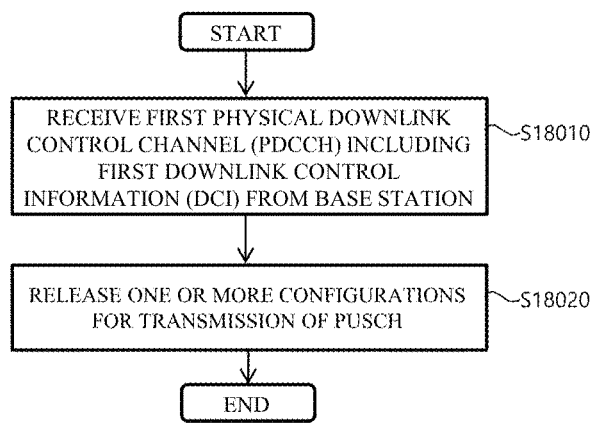
FIG. 18 is a flowchart illustrating an example of a method for releasing a configuration configured for transmission of a PUSCH by a user equipment according to an embodiment of the present invention.

FIG. 18 is a flowchart illustrating an example of a method for releasing a configuration configured for transmission of a PUSCH by a user equipment according to an embodiment of the present invention.

Referring to FIG. 18, when a plurality of configurations for the transmission of the PUSCH (e.g., configured grant) are activated for the user equipment, the user equipment may release a plurality of configurations (or configured grants) based on DCI transmitted from the base station.

Specifically, the user equipment may perform the transmission of the PUSCH by using one or more activated configurations. In this case, the transmission of the PUSCH may be periodically transmitted through a plurality of resources repeatedly configured based on the configured grant, and the PUSCH may be transmitted by including different transmission blocks in each resource.

Then, the user equipment may receive a first physical downlink control channel (PDCCH) including first downlink control information (DCI), from the base station (S18010).

In this case, the DCI may include the fields and parameters described in FIGS. 12 to 17 and Proposal 1 and Proposal 2 described above.

For example, the DCI may include at least one of an NDI field, a HARQ process number field, an RV field, and an FDRA field for determining whether the DCI is valid. In this case, the HARQ process number field may not be used to determine the validation of the DCI according to whether one configuration is activated or a plurality of configurations are activated for repetitive transmission of the PUSCH.

In addition, when a plurality of configurations are activated for the repetitive transmission of the PUSCH, first DCI may be configured for the transmission of the PUSCH based on the configured grant to include a first specific identifier (ID) for releasing one or more configurations. In this case, the first specific identifier may indicate one or more configurations configured for the transmission of the PUSCH.

In this case, the PUSCH represents a channel periodically transmitted through resources configured repeatedly according to the configured grant.

If a plurality of configurations are activated for repetitive transmission of the PUSCH, the first specific identifier may be indicated by the hybrid automatic repeat request (HARQ) process number (HARQ process number) field of the first DCI, and the HARQ process number field may be used to identify the one or more configurations among the plurality of configurations.

Therefore, the user equipment may release a plurality of configurations at once using one DCI based on a specific identifier indicated by the HARQ process number field.

Then, the user equipment may release one or more configurations indicated by the first specific identifier of the received DCI (S18020), and may stop periodic transmission of the PUSCH based on the configured grant.

This method may be equally applied even when a plurality of SPS PDSCH configurations are configured. In this case, the DCI may be scrambled with the CS-RNTI as the first DCI.

Even when a plurality of configured grants or SPS PDSCH configurations are configured and activated using the method, a plurality of activated configurations may be released through one DCI.

Figure 19:
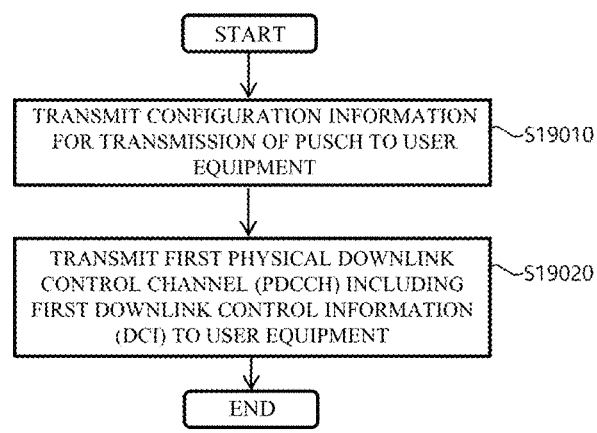
FIG. 19 is a flowchart illustrating an example of a method for releasing a configuration configured in a user equipment for transmission of a PUSCH by a base station according to an embodiment of the present invention.

FIG. 19 is a flowchart illustrating an example of a method for releasing a configuration configured in a user equipment for transmission of a PUSCH by a base station according to an embodiment of the present invention.

Referring to FIG. 19, when a plurality of configurations for the transmission of the PUSCH (e.g., configured grant) are activated for the user equipment, the base station may indicate, to the user equipment, the release of a plurality of configurations (or configured grants) through one DCI.

Specifically, the base station may allow the user equipment to be configured with one or more activated configurations for the transmission of the PUSCH. In this case, the transmission of the PUSCH may be periodically transmitted through a plurality of resources repeatedly configured based on the configured grant, and the PUSCH may be transmitted by including different transmission blocks in each resource.

Then, the base station may transmit configuration information for the repetitive transmission of the PUSCH to the user equipment (S19010). In this case, the configuration information may include a plurality of identifiers corresponding to specific values of the HARQ process number field, and each of the plurality of identifiers may individually correspond to one or more configurations for the configured grant-based PUSCH transmission.

The one or more configurations corresponding to the plurality of identifiers may be released when the HARQ process number field is indicated by a specific value.

Then, the base station may transmit, to the user equipment, a first physical downlink control channel (PDCCH) including first downlink control information (DCI) (S19020).

In this case, the DCI may include the fields and parameters described in FIGS. 12 to 17 and Proposal 1 and Proposal 2 described above.

For example, the DCI may include at least one of an NDI field, a HARQ process number field, an RV field, and an FDRA field for determining whether the DCI is valid. In this case, the HARQ process number field may not be used to determine the validation of the DCI according to whether one configuration is activated or a plurality of configurations are activated for repetitive transmission of the PUSCH.

In addition, when a plurality of configurations are activated for repetitive transmission of the PUSCH, the first DCI may be configured for the transmission of the PUSCH based on the configured grant to include a first specific identifier (ID) for releasing one or more configurations. In this case, the first specific identifier may indicate one or more configurations configured for the transmission of the PUSCH.

In this case, the PUSCH represents a channel periodically transmitted through resources configured repeatedly according to the configured grant.

If a plurality of configurations are activated for repetitive transmission of the PUSCH, the first specific identifier may be indicated by the hybrid automatic repeat request (HARQ) process number (HARQ process number) field of the first DCI, and the HARQ process number field may be used to identify the one or more configurations among the plurality of configurations.

Accordingly, the base station may indicate the release of a plurality of configurations for the user equipment by using a specific identifier indicated by the HARQ process number field included in one DCI.

By this method, even when multiple configurations, rather than one configuration, are activated for repetitive transmission of the PUSCH, release of a plurality of activated configurations may be indicated at once through the specific field of the DCI indicating a plurality of activated configurations.

The above description of the present invention is merely illustrative, and it would be easily understood that those of ordinary skill in the art could easily make modifications without departing from the technical concept of the present invention or changing essential features. Therefore, the above embodiments should be considered illustrative and should not be construed as limiting. For example, each component described as a single type may be distributed, and likewise, components described as being distributed may be implemented as a combined form.

The scope of the present invention is indicated by the following claims rather than the detailed description, and it should be construed that all changes or modifications derived from the meaning and scope of the claims and their equivalents are included in the scope of the present invention.

What is claimed is:

1. A method performed by a user equipment in a wireless communication system, the method comprising:
   receiving a physical downlink control channel (PDCCH) including downlink control information (DCI) format from a base station,
   wherein the DCI format includes a frequency domain resource assignment (FDRA) field, a modulation and coding scheme (MCS) field, and a redundancy version (RV) field,
   wherein, when multiple semi-persistent scheduling physical downlink shared channel (SPS PDSCH) configurations are provided, the use of the DCI format to release some or all of the multiple SPS PDSCH configurations is determined based on a value of the FDRA field according to a FDRA type; and
   releasing the some or all of the multiple SPS PDSCH configurations based on the DCI format when the multiple SPS PDSCH configurations are provided and the DCI format is used to release the some or all of the multiple SPS PDSCH configurations;
   wherein the use of the DCI format to release the some or all of the multiple SPS PDSCH configurations is determined depending on whether all bits of the FDRA field are set to '0' when a dynamic switch is configured in which the FDRA type is determined according to a value of a most significant bit (MSB) of the FDRA field.

2. The method of claim 1,
   wherein the DCI format is used to release the some or all of the multiple SPS PDSCH configurations depending on whether all bits of the FDRA field are set to '0' when the FDRA type is a bitmap-based resource allocation type.

3. The method of claim 2,
   wherein a resource allocation scheme for the user equipment is a scheme indicating whether to allocate a resource block group (RBG) using a bitmap when the FDRA type is the bitmap-based resource allocation type.

4. The method of claim 1,
   wherein the DCI format is used to release the some or all of the multiple SPS PDSCH configurations depending on whether all bits of the FDRA field are set to '1' when the FDRA type is a resource indicator value (RIV)-based resource allocation type.

5. The method of claim 4,
wherein a resource allocation scheme for the user equipment is a scheme indicating a start and a length of an allocated resource block (RB) set when the FDRA type is the RIV-based resource allocation type.

6. The method of claim 1,
wherein the use of the DCI format to release the some or all of the multiple SPS PDSCH configurations is determined by further considering the MCS field and the RV field.

7. The method of claim 1,
wherein the DCI format further includes a hybrid automatic repeat request (HARQ) process number field,
wherein the HARQ process number field is considered to determine whether the DCI format is used to release a single SPS PDSCH configuration when the single SPS PDSCH configuration is provided, and
wherein the HARQ process number field is not considered to determine whether the DCI format is used to release the some or all of the multiple SPS PDSCH configurations when the multiple SPS PDSCH configurations are provided.

8. A user equipment configured to operate in a wireless communication system, the user equipment comprising:
a communication module; and
a processor controlling the communication module,
wherein the processor is configured to:
receive a physical downlink control channel (PDCCH) including downlink control information (DCI) format from a base station,
wherein the DCI format includes a frequency domain resource assignment (FDRA) field, a modulation and coding scheme (MCS) field, and a redundancy version (RV) field,
wherein, when multiple semi-persistent scheduling physical downlink shared channel (SPS PDSCH) configurations are provided, the use of the DCI format to release some or all of the multiple SPS PDSCH configurations is determined based on a value of the FDRA field according to a FDRA type; and
release the some or all of the multiple SPS PDSCH configurations based on the DCI format when the multiple SPS PDSCH configurations are provided and the DCI format is used to release the some or all of the multiple SPS PDSCH configurations;

wherein the use of the DCI format to release the some or all of the multiple SPS PDSCH configurations is determined depending on whether all bits of the FDRA field are set to '0' when a dynamic switch is configured in which the FDRA type is determined according to a value of a most significant bit (MSB) of the FDRA field.

9. The user equipment of claim 8,
wherein the DCI format is used to release the some or all of the multiple SPS PDSCH configurations depending on whether all bits of the FDRA field are set to '0' when the FDRA type is a bitmap-based resource allocation type.

10. The user equipment of claim 9,
wherein a resource allocation scheme for the user equipment is a scheme indicating whether to allocate a resource block group (RBG) using a bit map when the FDRA type is the bitmap-based resource allocation type.

11. The user equipment of claim 8,
wherein the DCI format is used to release the some or all of the multiple SPS PDSCH configurations depending on whether all bits of the FDRA field are set to '1' when the FDRA type is a resource indicator value (RIV)-based resource allocation type.

12. The user equipment of claim 9,
wherein a resource allocation scheme for the user equipment is a scheme indicating a start and a length of an allocated resource block (RB) set when the FDRA type is the RIV-based resource allocation type.

13. The user equipment of claim 8,
wherein the use of the DCI format to release the some or all of the multiple SPS PDSCH configurations is determined by further considering the MCS field and the RV field.

14. The user equipment of claim 8,
wherein the DCI format further includes a hybrid automatic repeat request (HARQ) process number field,
wherein the HARQ process number field is considered to determine whether the DCI format is used to release a single SPS PDSCH configuration when the single SPS PDSCH configuration is provided, and
wherein the HARQ process number field is not considered to determine whether the DCI format is used to release the some or all of the multiple SPS PDSCH configurations when the multiple SPS PDSCH configurations are configured provided.

* * * * *